US011613399B2

(12) United States Patent
Tsukatani

(10) Patent No.: US 11,613,399 B2
(45) Date of Patent: Mar. 28, 2023

(54) CONTAINER AND METHOD OF PRODUCING CONTAINER

(71) Applicant: TAISEI KAKO CO., LTD., Osaka (JP)

(72) Inventor: Takashi Tsukatani, Baraki (JP)

(73) Assignee: TAISEI KAKO CO., LTD., Osaka (JP)

( * ) Notice: Subject to any disclaimer, the term of this patent is extended or adjusted under 35 U.S.C. 154(b) by 97 days.

(21) Appl. No.: 16/349,432

(22) PCT Filed: Nov. 15, 2017

(86) PCT No.: PCT/JP2017/041009
§ 371 (c)(1),
(2) Date: May 13, 2019

(87) PCT Pub. No.: WO2018/092790
PCT Pub. Date: May 24, 2018

(65) Prior Publication Data
US 2019/0300228 A1 Oct. 3, 2019

(30) Foreign Application Priority Data
Nov. 20, 2016 (JP) ............................ JP2016-225585

(51) Int. Cl.
*B65D 1/40* (2006.01)
*B29C 49/48* (2006.01)
(Continued)

(52) U.S. Cl.
CPC ................ *B65D 1/40* (2013.01); *B29C 49/48* (2013.01); *B65D 1/02* (2013.01); *B65D 1/08* (2013.01);
(Continued)

(58) Field of Classification Search
CPC ........................ B65D 81/3869; A47G 19/2288
(Continued)

(56) References Cited

U.S. PATENT DOCUMENTS 3,827,925 A * 8/1974 Douglas ............ B29C 66/73921 215/12.1
4,018,904 A * 4/1977 Muraoka ................ B65D 11/16 426/115
(Continued)

FOREIGN PATENT DOCUMENTS

JP H04-10849 B2 2/1992
JP 2007-99330 A 4/2007
(Continued)

OTHER PUBLICATIONS

Extended European Search Report issued in corresponding European Application No. 17871397.0 dated Jun. 5, 2020, 7 pages.
(Continued)

*Primary Examiner* — Jeffrey R Allen
(74) *Attorney, Agent, or Firm* — Snyder, Clark, Lesch & Chung, LLP

(57) ABSTRACT

A container includes a capitula to put contents into and out from the container, an inside container main body, in which a portion to accommodate the contents is formed, and an outside container main body, which is formed on an outer periphery side of the inside container main body, and surrounds the inside container main body. The inside container main body and the outside container main body are integrated at the capitula. A first side peripheral wall of the inside container main body and a second side peripheral wall of the outside container main body are attached to each other and are formed as a double accumulating portion at least at a portion of the first side peripheral wall. A lower end of the second side peripheral wall includes an extended foot portion that is extended to a location lower than a bottom of the inside container main body.

9 Claims, 13 Drawing Sheets

(51) Int. Cl.

| | |
|---|---|
| ***B65D 1/08*** | (2006.01) |
| ***B65D 1/32*** | (2006.01) |
| ***B65D 1/02*** | (2006.01) |
| ***B65D 83/00*** | (2006.01) |
| ***A61J 1/05*** | (2006.01) |

(52) U.S. Cl.
CPC ............... *B65D 1/32* (2013.01); *B65D 83/00* (2013.01); *A61J 1/05* (2013.01)

(58) Field of Classification Search
USPC ................ 215/12.1; 220/62.11, 62.12, 62.13
See application file for complete search history.

(56) References Cited

U.S. PATENT DOCUMENTS

| | | | | |
|---|---|---|---|---|
| 9,307,853 | B2 * | 4/2016 | Melton | B29C 66/545 |
| 9,750,359 | B2 * | 9/2017 | Kah, Jr. | A47G 19/2288 |
| 2003/0080128 | A1 * | 5/2003 | Brodner | B65D 25/205 220/23.87 |
| 2014/0138394 | A1 * | 5/2014 | Heisner | B65D 1/40 220/675 |
| 2017/0367509 | A1 * | 12/2017 | Achan, Jr. | A47G 19/23 |

FOREIGN PATENT DOCUMENTS

| | | | |
|---|---|---|---|
| JP | 4251351 | B2 | 4/2009 |
| JP | 4251352 | B2 | 4/2009 |
| JP | 4357183 | B2 | 11/2009 |
| JP | 5022826 | B2 | 9/2012 |
| JP | 2016-094213 | A | 5/2016 |

OTHER PUBLICATIONS

International Search Report issued in corresponding International Application No. PCT/JP2017/0401009, dated Dec. 19, 2017, 9 pages.

* cited by examiner (A)

(B)

(A)

(B)

(A)

(B)

(A)
(B)
10
10
14
16
18
20
22
24
26
28
30
32
32a
34
36

CONTAINER AND METHOD OF PRODUCING CONTAINER

TECHNICAL FIELD

The invention relates to a container and a method of producing a container, in which the container is a container that can be self-sustaining, and in which the container is to accommodate the contents:

including, for instance, liquid material, fluid, half fluid, and solids such as solid body and particulate objects that are accommodated by the accommodating portion in the container, for example, in the container of the pharmaceutical container such as an eye drop container, a collunarium container, and an applying container and the like (hereinafter referred to as "contents").

Moreover, the invention relates to a container and a method of producing a container, in which the interior content of contents accommodate in the container is reduced.

BACKGROUND ART

In conventional, for instance, in the pharmaceutical container such as the eye drop container, the collunarium container, and the applying container, there is a demand that the interior content a small amount is reduced.

That is, about the pharmaceutical formulated in the hospital, by reducing the interior content of the pharmaceutical container, it becomes easy to be going to consume in a short term.

Therefore, the patient can use the pharmaceutical in the use time limit.

Thus, a regular formulation becomes possible for the patient.

In other words, the pharmaceutical is consumed in a short term so that the pharmaceutical should be formulated again.

Accordingly, there is an effect that presses an inevitable going to hospital regularly for the patient who needs a regular examination.

In the field in the pharmaceutical container like this,

The demand that reducing the interior content of the pharmaceutical container has risen.

PRIOR ART REFERENCE

Patent Document

[Patent Document 1]
JP, 2016-94213, A
[Patent Document 2]
JP Examined Patent Publication H04 (1992)-010849
[Patent Document 3]
JP4251351
[Patent Document 4]
JP4251352
[Patent Document 5]
JP4357183

SUMMARY OF INVENTION

Problems to be Solved by the Invention

However, like this, to make the interior content of contents accommodated by the container is reduced, the size of the container itself is considered to be reduced compared with conventional.

However, for instance, for the pharmaceutical container, as prescribed to Pharmaceutical Affairs Law Section 50, in the pharmaceutical, a constant data is should be described on the direct container or the direct encapsulation thereof.

Therefore, if the size of the pharmaceutical container is narrow and small, the indication space is narrow.

Accordingly, it is difficult to describe a constant data provided in Pharmaceutical Affairs Law Section 50.

Therefore, in Patent Document 1 (JP, 2016-94213, A), the instant applicant has already disclosed a container and a method of producing a container, in which the interior content of the container can be reduced, and in which the indication space portion where the indication of information on the label and the print, etc. without reducing the size of the container can be secured, and in which the container is a container that can be self-sustaining.

FIG. 10 (A) is cross-sectional view of the container 100 of Patent Document 1.

FIG. 10 (B) is a longitudinal sectional view of the container 100 of Patent Document 1.

FIG. 11 is a schematic view that describes the method of producing of the container 100 of Patent Document 1.

As shown in FIG. 10, the container 100 of Patent Document 1 includes:

the container main body 104, in which the accommodating portion 102 that accommodates contents of the cross section elliptic shape, is formed, and the shoulder 106 in which the diameter of the container main body 104 has gradually become small.

In addition, in the center of this shoulder 106, in order to detachably attach the cover member such as cap (not shown), the capitula 110, in which the male screw 108 is formed, is provided.

Moreover, the extended foot portion 116, in which the side peripheral wall 112 of the container main body 104 is downwardly extended from the bottom 114 of the container main body 104, is provided.

Moreover, in the producing method of manufacturing such structural container 100, as shown in FIG. 11 (A), the parison 118 is molded by the injection molding step.

This parison 118 has a shape include:

the main body portion 122 comprising the accommodating portion forming portion 120 that should become the container main body 104, and the extended foot portion 128 corresponding to the extended foot portion 116, in which it is more enlarged than this main body portion 122, and in which the side peripheral wall 124 of the main body portion 122 is downwardly extended from the bottom 126 of the main body portion 122.

Thereafter, as shown in FIG. 11 (B), by using the blow molding die 130 and by the blow molding step, through the capitula of the main body portion 122 of the parison 118 obtained by injection molding, air is blown into the accommodating portion forming portion 120.

As a result, the side peripheral wall 124 of the main body portion 122 of parison 118 is swollen and the container main body 104 is formed.

However, in the container 100 of Patent Document 1, the thickness of the container main body 104 is thick.

As a result, as shown by the arrow of FIG. 10 (B), when the side peripheral wall 112 of the container main body 104 is picked up and pushed by the finger etc. to exhaust contents from the container main body 104 (hereinafter, simply referred to as "squeeze"), it is not easy to be deformed by entering the state that the bottom 114 of the container main body 104 is stretched.

Therefore, it is inferior to the squeeze play effect.

Moreover, since the side peripheral wall 112, the bottom 114, and the extended foot portion 116 of the container main body 104 are integral, the rigidity is high.

Even if the squeeze play is done, it is not easy to be deformed.

As a result, it is inferior to the squeeze play effect.

Moreover, in Patent Document 2 (JP Examined Patent Publication H04 (1992)-010849), the double container 200 having the structure as shown in FIG. 12 is proposed.

FIG. 12 (A) is a longitudinal sectional view of the double container 200 of Patent Document 2.

FIG. 12 (B) is a schematic view that describes the method of producing of the double container 200 of Patent Document 2.

The double container 200 of Patent Document 2, as shown in FIG. 12 (A), includes:

the inside container main body 204, and the outside container main body 206 which is formed to the outer periphery side of the inside container main body 204 and which is formed that the inside container main body 204 is surrounded in the spaced state from the inside container main body 204.

In addition, these inside container main body 204 and outside container main body 206 are integrated in the capitula 208.

Moreover, the lower end of the outside container main body 206 has substantially identical position to the bottom of the inside container main body 204.

In the producing method of manufacturing of such structural double container 200, as shown in FIG. 12 (B), the parison 210 is molded by the injection molding step.

The parison 210 includes:

the inside main body portion 214 comprising accommodating portion forming portion 212 that should become the inside container main body 204, and the outside main body portion 220 which is enlarged from this inside edge main body portion 214.

Moreover, the outside main body portion 220 has a shape in which the side peripheral wall 216 is extended to the position of the bottom 218 of the inside main body portion 214.

Thereafter, as shown in FIG. 12 (B), the blow molding die 222 is used and by the blow molding step, through the capitula of the inside main body portion 214 of parison 210 obtained by injection molding, air is blown into the accommodating portion forming portion 212.

As a result, the side peripheral wall 215 of the inside main body portion 214 of the parison 210 is swollen, so that the inside container main body 204 is formed.

However, in the double container 200 of Patent Document 2, the inside main body 204 and the outside container main body 206 should be spaced state.

Therefore, as shown in FIG. 12 (B), in the lower die 224 of the blow molding die 222, the protruding portion 226, which is fitted into between the inside main body portion 214 and the outside main body portion 220 of the parison 210, should be formed.

As a result, the structure of the blow molding die 222 is complicate, and the cost is high.

Moreover, the state between the inside container main body 204 and the outside container main body 206 is of spaced state.

Therefore, even if the sidewall of the outside container main body 206 is squeezed, it is not easy to enter the state that the inside container main body 204 is pushed and it is inferior to the squeeze play effect.

In addition, in the double container 200 of Patent Document 2, the lower end 206a of the outside container main body 206 is set to substantially identical position to the bottom of the inside container main body 204.

Accordingly, there is no extended foot portion such as Patent Document 1.

Thus, for instance, as disclosed in Patent Document 5 (JP4357183) described later, in case that the double container 200 of Patent Document 2 is used for a double container having a structure, in which the inside container is not returned to former shape when the squeeze play is operated (i.e. structure that becomes like the state that the inside container is deformed), when the squeeze play is done, the bottom 202 of the inside container main body 204 is downwardly protruded from the lower end 206a of the outside container main body 206.

As a result, the container can not be self-sustaining.

Moreover, the double container and the forming method are disclosed in Patent Document 3 (JP4251351) and Patent Document 4 (JP4251352).

FIG. 13 (A) is a longitudinal sectional view of double container 300 of Patent Document 3 and Patent Document 4.

FIG. 13 (B) is a schematic view that describes the producing method of double container 300 of Patent Document 3 and Patent Document 4.

The double containers 300 of these Patent Documents 3 and of Patent Document 4, include: as shown in FIG. 13 (A), the inside container main body 302, and the outside container main body 304, which is formed to the outer periphery side of the inside container main body 302, and which is formed such a state that it is apart from the inside container main body 302 and the inside main body 302 is surrounded.

In addition, these inside container main body 302 and the outside container main body 304 are integrated in capitula 306.

Moreover, the lower end 304a of the outside container main body 304 is set to substantially identical position to the bottom 302a of the inside container main body 302.

Moreover, it is a structure that the lower end 304a of the outside container main body 304 is curved curl portion 308, and that the inner periphery edge of the curl portion 308 is sealed and fixed by the adhesive to the outer periphery of bottom 302a of inside container main body 302.

In the producing method of manufacturing such structural double container 300, as shown in FIG. 13 (B), the parison 310 is molded by the injection molding step.

The parison 310 includes:

the inside main body portion 314 comprising the accommodating portion forming portion 312 that should become inside container main body 302, and the outside main body portion 316 which is enlarged from this inside main body portion 314.

The outside main body portion 316 has a shape that the side peripheral wall 315 is extended to the position of the lower end 304a of the outside container main body 304.

Thereafter, as shown in FIG. 13 (B), by using the blow molding die 138 and by the blow molding step, through the capitula of the inside main body portion 314 of the parison 310 obtained by injection molding, air is blown into the accommodating portion forming portion 312.

As a result, the side peripheral wall 311 of the inside main body portion 314 of the parison 310 is swollen and the inside container main body 302 is formed.

In addition, thereafter, the lower end 304a of the outside container main body 304 is made to be the curved curl portion 308, and the inner periphery edge of the curl portion 308 is sealed and fixed by the adhesive to the outer periphery of bottom 302a of inside container main body 302.

However, in the double container 300 of Patent Document 3 and Patent Document 4, the inside container main body 302 and the outside container main body 304 should be spaced state.

Therefore, as shown in FIG. 13 (B), in the upper die 320 of the blow molding die 318, the protruding portion 322, which is fitted into between the inside main body portion 314 and the outside main body portion 316 of the parison 310, should be formed.

As a result, the structure of the blow molding die 318 is complicate, and the cost is high.

Moreover, after the blow molding step, separately, the lower end 304a of the outside container main body 304 is bent to be the curved curl portion 308.

Moreover, the bend and the bonding step, in which the inner periphery edge of the curl portion 308 is sealed and fixed by the adhesive to the outer periphery of bottom 302a of inside container main body 302, are needed.

Therefore, a complex step is necessary, and it takes time and trouble, and the cost is also high.

Moreover, the state between the inside main body 204 and the outside container main body 206 is of spaced state.

Therefore, even if the sidewall of the outside container main body 304 is squeezed, it is not easy to enter the state that the inside container main body 302 is pushed and it is inferior to the squeeze play effect.

In addition, in the double container 300 of Patent Document 3 and Patent Document 4, the lower end 304a of the outside container main body 304 is set to substantially identical position to the bottom 302a of the inside container main body 302.

Accordingly, there is no extended foot portion such as Patent Document 1.

Moreover, the inner periphery edge of the curl portion 308 is sealed and fixed by the adhesive to the outer periphery of bottom 302a of inside container main body 302.

Thus, for instance, as disclosed in Patent Document 5 (JP4357183), it is impossible that the double container 300 of Patent Document 3 and Patent Document 4 is used for a double container having a structure, in which inside container main body 302 is not deformed easily and the inside container is not returned to former shape when the squeeze play is operated (i.e. structure that becomes like the state that the inside container is deformed).

The invention considers such a current state and is object to provide to a container and a method of producing a container, in which the interior content of the container can be reduced, and in which the indication space portion where the indication of information on the label and the print, etc. without reducing the size of the container can be secured, and in which the container is a container that can be self-sustaining.

Moreover, the object of the invention is to provide a container and a method of producing a container, in which the integral molding is performed by the injection molding step and the blow molding step that is operated in a single forming machine, and in which the assembly process of the second step can be omitted, and in which a complicate, complex step is unnecessary, and the cost can be reduced, and in which foreign matter is not adhered, and quality is not decreased.

Moreover, the object of the invention is to provide a container and a method of producing a container, in which the visibility is superior and in which, for instance, it is easy to confirm such as kinds and the remainder quantity of liquids and confirmations of the foreign matter contained in contents, i.e. of contents accommodated in an accommodating portion of a container main body.

In addition, the object of the invention is to provide a container and a method of producing a container, in which, when using it as an eye drop container, it is easy to push out (discharge) contents, that is accommodated in the accommodating portion, out of the container main body by squeezing.

Moreover, the object of the invention is to provide a container and a method of producing a container, in which the above-mentioned squeeze property is extremely is superior and in which, as disclosed in Patent Document 5 (JP4357183), it can be used for a double container having a structure, in which the inside container is not returned to former shape when the squeeze play is operated (i.e. structure that becomes like the state that the inside container is deformed),

Solution to Problem

The invention was invented to attain the problem and the purpose in the above-mentioned prior art, and a container of the invention, comprising:

a capitula to put contents in and out in the container, and an inside container main body, in which an accommodating portion that accommodates the contents is formed, and an outside container main body, which is formed to outer periphery side of the inside container main body, and which is formed to surround the inside container main body, and in which the inside container main body and an outside container main body are integrated in the capitula, and in which the side peripheral wall of the inside container main body and the side peripheral wall of the outside container main body is formed as a double accumulating portion at least in a portion of the side peripheral wall of the inside container main body, and in which the lower end of the side peripheral wall of the outside container main body includes an extended foot portion that is extended to be located downwardly from bottom of the inside container main body.

By component like this, the interior content of the container can be reduced.

Moreover, the lower end of the side peripheral wall of the outside container main body includes an extended foot portion that is extended to be located downwardly from bottom of the inside container main body.

Therefore, the indication space portion where the indication of information on the label and the print, etc. without reducing the size of the container can be secured.

In addition, the lower end of the side peripheral wall of the outside container main body includes an extended foot portion that is extended to be located downwardly from bottom of the inside container main body.

Therefore, the container itself can be self-sustaining and it is convenient.

Moreover, when the container is used for instance for applying an eye drop and for a collunarium, the size of the caliber of the container main body is limited because of the nozzle and the pump.

In this case, even if capacity necessary for limited usable years is secured by the size of the caliber of the limited container main body, the length of the sack body of the container main body never becomes long.

As a result, the length of the container becomes long and the container itself does not enlarge and, and it is convenient for handles and the storage etc.

In addition, the side peripheral wall of the inside container main body and the side peripheral wall of the outside container main body is formed as a double accumulating portion at least in a portion of the side peripheral wall of the inside container main body.

Therefore, the thickness of the side peripheral wall of the inside container main body and thickness of the side peripheral wall of an outside container main body and the thickness of the bottom of the inside container main body and can respectively be small (i.e. thin).

Thus, the thickness of the side peripheral wall of the inside container main body and the thickness of the side peripheral wall of the outside container main body can be thinned As a result, the visibility is superior and for instance, it is easy to confirm such as kinds and the remainder quantity of liquids and confirmations of the foreign matter contained in contents, i.e. of contents accommodated in an accommodating portion of a container main body.

Moreover, the thickness of the side peripheral wall of the inside container main body and thickness of the side peripheral wall of the outside container main body and the thickness of the bottom of the inside container main body are thin.

Therefore, the flexibility is superior and for instance, when using it for the eye drop container, it is easy to squeeze.

Accordingly, it is superior in the effect that contents accommodated in the accommodating portion of the container main body is discharged.

In addition, the side peripheral wall of the inside container main body and the side peripheral wall of the outside container main body is formed as a double accumulating portion at least in a portion of the side peripheral wall of the inside container main body.

Moreover, the lower end of the side peripheral wall of the outside container main body includes an extended foot portion that is extended to be located downwardly from bottom of the inside container main body.

Thus, as disclosed in Patent Document 5 (JP4357183), even if it is used for a double container having a structure, in which the inside container is not returned to former shape when the squeeze play is operated (i.e. structure that becomes like the state that the inside container is deformed), when the squeeze play is done, the bottom of the inside container main body is not downwardly protruded from the lower end of the outside container main body.

As a result, the container can be self-sustaining.

In addition, when the container of the present invention is used for the pharmaceutical container in the eye drop container, the collunarium container, and the applying container, etc. for instance, the interior content can be reduced.

That is, about the pharmaceutical formulated in the hospital, by reducing the interior content of the pharmaceutical container, it becomes easy to be going to consume in a short term.

Therefore, the patient can use the pharmaceutical in the use time limit.

Thus, a regular formulation becomes possible for the patient.

In other words, the pharmaceutical is consumed in a short term so that the pharmaceutical should be formulated again.

Accordingly, there is an effect that presses an inevitable going to hospital regularly for the patient who needs a regular examination.

Moreover, the method of producing the container of the invention being the method of producing the container, wherein the container comprising:

a capitula to put contents in and out in the container, and an inside container main body, in which an accommodating portion that accommodates the contents is formed, and an outside container main body, which is formed to outer periphery side of the inside container main body, and which is formed to surround the inside container main body, and in which the inside container main body and an outside container main body are integrated in the capitula, and in which the side peripheral wall of the inside container main body and the side peripheral wall of the outside container main body is formed as a double accumulating portion at least in a portion of the side peripheral wall of the inside container main body, and in which the lower end of the side peripheral wall of the outside container main body includes an extended foot portion that is extended to be located downwardly from bottom of the inside container main body, the method of producing the container comprising: an injection molding step in which a parison is molded by using the injection mold, the parison comprising:

an inside main body portion including an accommodating portion forming portion that should become the inside container main body, and an outside main body portion that should become outside container main body, which is enlarged from the side peripheral wall of the inside main body portion, and in which a lower end of the side peripheral wall of the outside container main body includes an extended foot portion that is extended to be located downwardly from bottom of the inside container main body, and the method of producing the container further comprising: a blow molding step by using blow molding die, wherein air is blown in from a capitula of the main body portion of the parison obtained by the injection molding, and wherein the side peripheral wall of the inside main body portion is swollen and the inside container main body is formed, and wherein blow molding is performed so that the side peripheral wall of the inside container main body and the side peripheral wall of the outside container main body is formed as a double accumulating portion at least in a portion of the side peripheral wall of the inside container main body.

By component like this, the side peripheral wall of the inside container main body and the side peripheral wall of the outside container main body is formed as the double accumulating portion at least in the portion of the side peripheral wall of the inside container main body.

In addition, the container is that the lower end of the side peripheral wall of the outside container main body includes the extended foot portion that is extended to be located downwardly from bottom of the inside container main body.

The integrated container, in which the interior content is reduced, can be simply manufactured, so that the cost can be reduced.

Moreover, the integral molding is performed by the injection molding step and the blow molding step that is operated in a single forming machine.

Therefore, the bend and the bonding step, as disclosed in Patent Document 3 and Patent Document 4, can be omitted.

As a result, a complicate, complex step is unnecessary, and the cost can be reduced.

Therefore, the foreign matter might not adhere, and the quality never decreases.

Moreover, the container of the invention is characterized in that, in the double accumulating portion, the side peripheral wall of the inside container main body and the side peripheral wall of the outside container main body are separated.

Moreover, the method of producing the container of the invention is characterized in that, the blow molding is performed such that in the double accumulating portion, the side peripheral wall of the inside container main body and the side peripheral wall of the outside container main body are separated.

By component like this, in the double accumulating portion, the side peripheral wall of the inside container main body and the side peripheral wall of the outside container main body are separated.

Thus, the thickness of the side peripheral wall of the inside container main body and the thickness of the side peripheral wall of an outside container main body can be thinned Therefore, the flexibility is superior and for instance, when using it for the eye drop container, it is easy to squeeze.

Accordingly, it is superior in the effect that contents accommodated in the accommodating portion of the container main body is discharged.

Moreover, the container of the invention is characterized in that, in the double accumulating portion, the side peripheral wall of the inside container main body and the side peripheral wall of the outside container main body are welded.

Moreover, the method of producing the container of the invention is characterized in that, the blow molding is performed such that in the double accumulating portion, the side peripheral wall of the inside container main body and the side peripheral wall of the outside container main body are welded.

By component like this, in the double accumulating portion, the side peripheral wall of the inside container main body and the side peripheral wall of the outside container main body are welded.

Therefore, the strength is superior and the bottom of the inside container main body is thin and excellent in the flexibility.

As a result, for instance, when using it for the eye drop container, it is easy to squeeze.

Accordingly, it is superior in the effect that contents accommodated in the accommodating portion of the container main body is discharged.

Moreover, the invention is characterized in that, the thickness of the inside container main body is smaller than the thickness of the outside container main body.

By component like this, the thickness of the inside container main body is smaller than the thickness of the outside container main body.

Therefore, the inside container main body is excellent in the flexibility.

As a result, for instance, when using it for the eye drop container, it is easy to squeeze.

Accordingly, it is superior in the effect that contents accommodated in the accommodating portion of the container main body is discharged.

Moreover, the thickness of the inside container main body is smaller than the thickness of the outside container main body and the inside container main body is excellent in the flexibility.

Therefore, it suitable in case that, for example, as disclosed in Patent Document 5 (JP4357183), even if it is used for a double container having a structure, in which the inside container is not returned to former shape when the squeeze play is operated (i.e. structure that becomes like the state that the inside container is deformed).

Moreover, the invention is characterized in that, the thickness of the side peripheral wall of the outside container main body is gradually small toward the edge on the squeeze side.

By component like this, the thickness of the side peripheral wall of the outside container main body is gradually small toward the edge on the squeeze side.

As a result, when the container main body is squeezed at the squeeze play side, the container main body is easily flexured and squeezed on the squeeze play side.

Accordingly, it is superior in the effect that contents accommodated in the accommodating portion of the container main body is discharged.

Moreover, the invention is characterized in that, the thickness of the side peripheral wall of the outside container main body is gradually small toward the edge on an orthogonal side to the squeeze play side.

By component like this, the thickness of the side peripheral wall of the outside container main body is gradually small toward the edge on an orthogonal side to the squeeze play side.

As a result, when the container main body is squeezed at the squeeze play side, also on the side to the squeeze play side, the container main body is easily flexured and easily squeezed overall on the squeeze play side.

Accordingly, it is superior in the effect that contents accommodated in the accommodating portion of the container main body is discharged.

Advantageous Effects of Invention

According to the invention, the interior content of the container can be reduced.

Moreover, the lower end of the side peripheral wall of the outside container main body includes an extended foot portion that is extended to be located downwardly from bottom of the inside container main body.

Therefore, the indication space portion where the indication of information on the label and the print, etc. without reducing the size of the container can be secured.

In addition, the lower end of the side peripheral wall of the outside container main body includes an extended foot portion that is extended to be located downwardly from bottom of the inside container main body.

Therefore, the container itself can be self-sustaining and it is convenient.

Moreover, when the container is used for instance for applying an eye drop and for a collunarium, the size of the caliber of the container main body is limited because of the nozzle and the pump.

In this case, even if capacity necessary for limited usable years is secured by the size of the caliber of the limited container main body, the length of the sack body of the container main body never becomes long.

As a result, the length of the container becomes long and the container does not enlarge and, and it is convenient for handles and the storage etc.

In addition, the side peripheral wall of the inside container main body and the side peripheral wall of the outside container main body is formed as a double accumulating portion at least in a portion of the side peripheral wall of the inside container main body.

Therefore, the thickness of the side peripheral wall of the inside container main body and thickness of the side peripheral wall of an outside container main body and the thickness of the bottom of the inside container main body and can respectively be small (i.e. thin).

Thus, the thickness of the side peripheral wall of the inside container main body and the thickness of the side peripheral wall of an outside container main body can be thinned As a result, the visibility is superior and for instance, it is easy to confirm such as kinds and the remainder quantity of liquids and confirmations of the foreign matter contained in contents, i.e. of contents accommodated in an accommodating portion of a container main body.

Moreover, the thickness of the side peripheral wall of the inside container main body and thickness of the side peripheral wall of an outside container main body and the thickness of the bottom of the inside container main body are thin.

Therefore, the flexibility is superior and for instance, when using it for the eye drop container, it is easy to squeeze.

Accordingly, it is superior in the effect that contents accommodated in the accommodating portion of the container main body is discharged.

In addition, the side peripheral wall of the inside container main body and the side peripheral wall of the outside container main body is formed as a double accumulating portion at least in a portion of the side peripheral wall of the inside container main body.

Moreover, the lower end of the side peripheral wall of the outside container main body includes an extended foot portion that is extended to be located downwardly from bottom of the inside container main body.

Thus, as disclosed in Patent Document 5 (JP4357183), even if it is used for a double container having a structure, in which the inside container is not returned to former shape when the squeeze play is operated (i.e. structure that becomes like the state that the inside container is deformed), when the squeeze play is done, the bottom of the inside container main body is not downwardly protruded from the lower end of the outside container main body.

As a result, the container can be self-sustaining.

In addition, when the container of the present invention is used for the pharmaceutical container in the eye drop container, the collunarium container, and the applying container, etc. for instance, the interior content can be reduced.

That is, about the pharmaceutical formulated in the hospital, by reducing the interior content of the pharmaceutical container, it becomes easy to be going to consume in a short term.

Therefore, the patient can use the pharmaceutical in the use time limit.

Thus, a regular formulation becomes possible for the patient.

In other words, the pharmaceutical is consumed in a short term so that the pharmaceutical should be formulated again.

Accordingly, there is an effect that presses an inevitable going to hospital regularly for the patient who needs a regular examination.

In addition, according to the invention, the side peripheral wall of the inside container main body and the side peripheral wall of the outside container main body is formed as the double accumulating portion at least in the portion of the side peripheral wall of the inside container main body.

In addition, the container is that the lower end of the side peripheral wall of the outside container main body includes the extended foot portion that is extended to be located downwardly from bottom of the inside container main body.

The integrated container, in which the interior content is reduced, can be simply manufactured, so that the cost can be reduced.

Moreover, the integral molding is performed by the injection molding step and the blow molding step that is operated in a single forming machine.

Therefore, the bend and the bonding step, as disclosed in Patent Document 3 and Patent Document 4, can be omitted.

As a result, a complicate, complex step is unnecessary, and the cost can be reduced.

Therefore, the foreign matter might not adhere, and the quality never decreases.

BRIEF DESCRIPTION OF DRAWINGS

FIG. 1 (B) is a side view of the container in FIG. 1 (A).

FIG. 1 (C) is a top view of the container in FIG. 1 (A).

FIG. 2 (B) is cross-sectional view in the B-B line in FIG. 1 (C).

FIG. 7 (B) is cross-sectional view of the side peripheral wall 32 of the outside container main body 28 that shows another Embodiment of the container of the invention.

FIG. 8 (B) is similar cross-sectional view to FIG. 2 (B), in which another Embodiment of the container of the invention is shown.

FIG. 9 (B) is schematic cross-sectional view, in which the use of the container of the invention of FIG. 9 (A) is described.

FIG. 10 (B) is a longitudinal sectional view of the container 100 of Patent Document 1.

FIG. 12 (B) is a schematic view that describes the method of producing the double container 200 of Patent Document 2.

FIG. 13 (B) is a schematic view that describes the method of producing double container 300 of Patent Document 3 and Patent Document 4.

DESCRIPTION OF EMBODIMENTS

Figure 1:
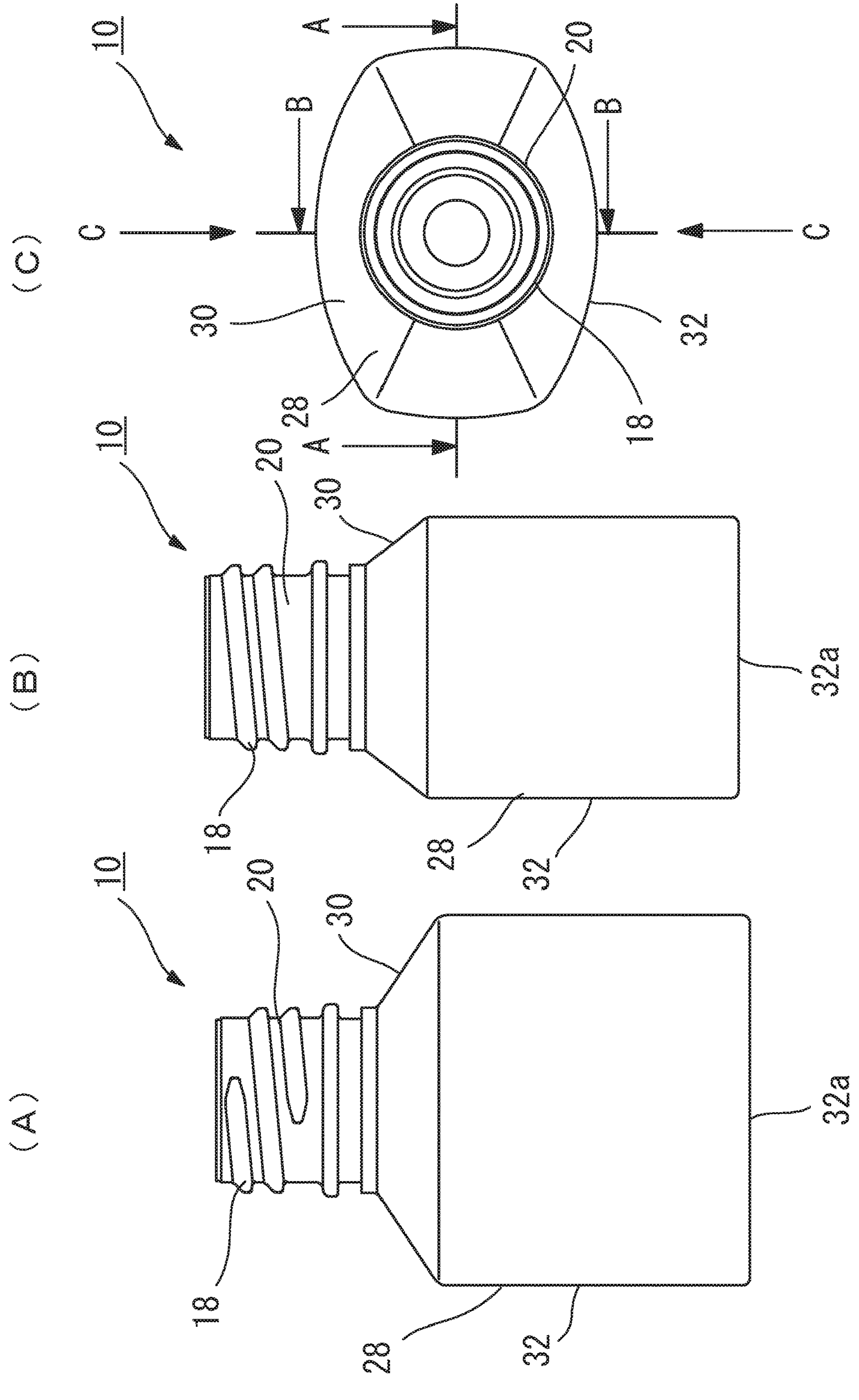
FIG. 1 (A) is a front view of the container of the invention.

Hereafter, the embodiment of the invention (Embodiment) is described in the detail or more on the basis of the drawing.

Embodiment 1

FIG. 1 (A) is a front view of the container of the invention.

FIG. 1 (B) is a side view of the container in FIG. 1 (A).

FIG. 1 (C) is a top view of the container in FIG. 1 (A).

Figure 2:
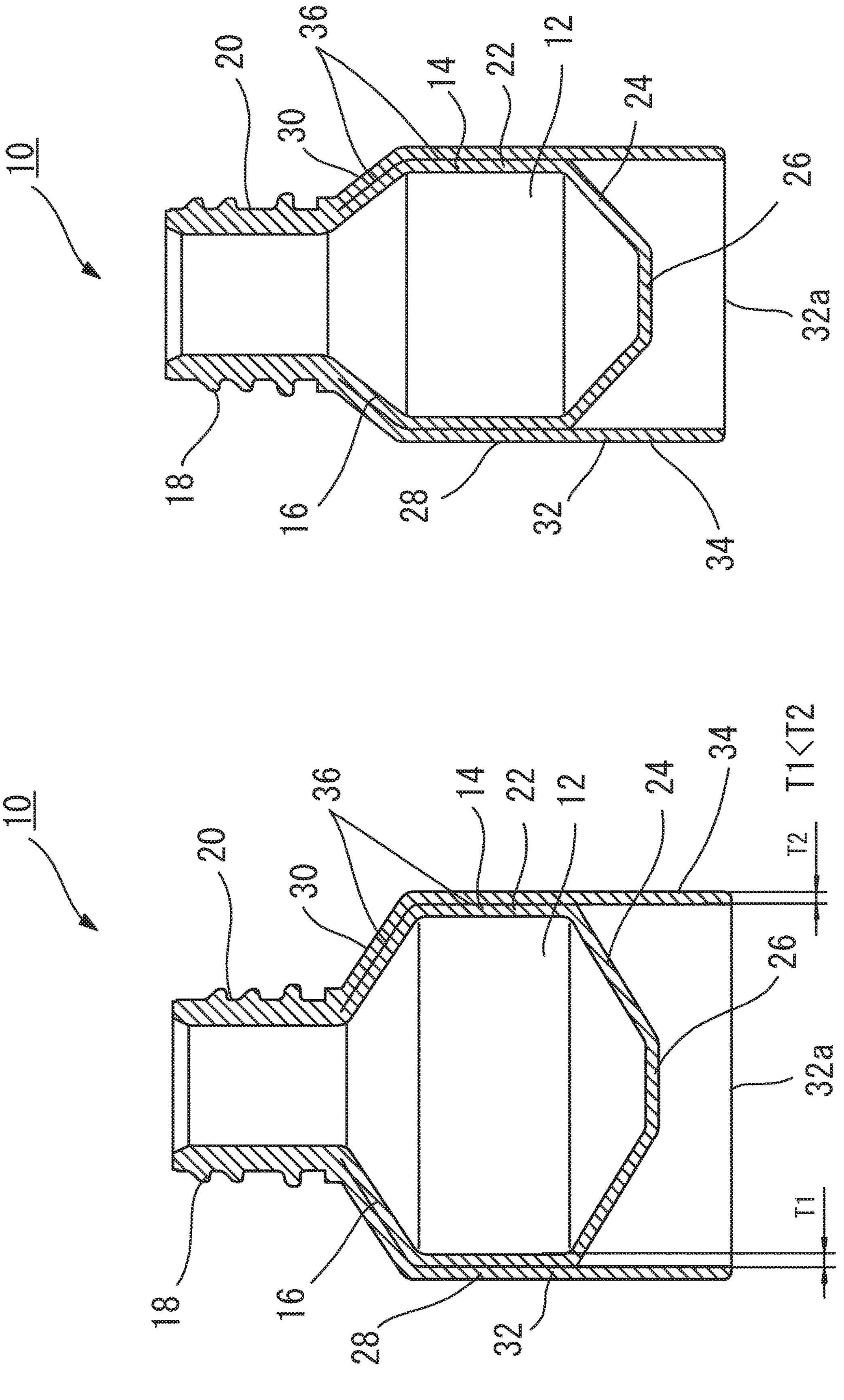
FIG. 2 (A) is cross-sectional view in the A-A line in FIG. 1 (C).

FIG. 2 (A) is cross-sectional view in the A-A line in FIG. 1 (C).

FIG. 2 (B) is cross-sectional view in the B-B line in FIG. 1 (C).

Reference numeral 10 shows the container of the invention in FIG. 1 (A)-FIG. 2 (B) as a whole.

A Container 10 of the invention is a container, in which the container is to accommodate the contents:

including, for instance, liquid material, fluid, half fluid, and solids such as solid body and particulate objects that are accommodated by the accommodating portion in the container, for example, in the container of the pharmaceutical container such as an eye drop container, a collunarium container, and an applying container and the like.

As shown in FIG. 1 (A)-FIG. 2 (B), the container 10 of the invention includes:

a container main body 14, in which an accommodating portion 12 that accommodates contents of the cross section elliptic shape, is formed, and a shoulder 16 in which the diameter of the container main body 14 has gradually become small.

In addition, in the center of this shoulder 16, in order to detachably attach a cover member such as cap (not shown), a capitula 20, in which a male screw 18 is formed and which is to put contents in and out in container 10, is provided.

Moreover, the inside container main body 14 includes a side peripheral wall 22 that extends downwardly from the outer periphery edge of the shoulder 16.

In addition, a sloping bottom 24 that protrudes downward like dome such that the radius thereof is gradually decreased from the lower end of this side peripheral wall 22, and a bottom 26 of flat type in lower end are formed.

On the other hand, at the outer periphery side of the inside container main body 14, to surround the inside container main body 14, an outside container main body 28, which has a substantially same cross section as the inside container main body 14, is formed.

In addition, the inside container main body 14 and the outside container main body 28 are integrated in the capitula 20.

In addition, a shoulder 30, of which diameter gradually became small, is provided to the outside container main body 28.

Moreover, a side peripheral wall 32 is formed downward from the outer periphery edge of this shoulder 30.

Moreover, as shown in FIG. 2, an extended foot portion 34 is extended, such that a lower end 32*a* of this side peripheral wall 32 is located downwardly from bottom of the inside container main body.

In addition, in this Embodiment, the extended foot portion 34 is formed to the circumference of the side peripheral wall 32 of the outside container main body 28.

Moreover, as shown in FIG. 2, the side peripheral wall 22 of the inside container main body 14 and the side peripheral wall 32 of the outside container main body 28 is formed as a double accumulating portion 36 at least in a portion of the side peripheral wall 22 of the inside container main body 14.

That is, in this Embodiment, the side peripheral wall 22 of the inside container main body 14 and the side peripheral wall 32 of the outside container main body 28 is formed as a double accumulating portion 36 in a portion of the side peripheral wall 22, from the portions of the shoulders 16 and 30.

In addition, in this specification, the shoulders 16 and 30 form respectively a part of the side peripheral wall 22 of the inside container main body 14 and the side peripheral wall 32 of the outside container main body 28.

In this Embodiment, although in the capitula 20, the male screw 18 is formed, this may be a female screw.

Moreover, for instance, the convexo-concave for the engagement of so-called "Snap fit type" may be formed.

Moreover, in this Embodiment, the inside container main body 14 and the outside container main body 28 have the cross section elliptic shape.

However, the shape of the inside container main body 14 and the outside container main body 28 is not limited in any way.

For instance, such as a cross section circular shape, a cross section rectangle shape, and a cross section polygonal shape and the like may be adopted appropriately.

By component like this, the interior content of the container 10 can be reduced.

Moreover, the lower end 32*a* of the side peripheral wall 32 of the outside container main body 28 includes an extended foot portion 34 that is extended to be located downwardly from the bottom 26 of the inside container main body 14.

Therefore, the indication space portion where the indication of information on the label and the print, etc. without reducing the size of the container can be secured.

In addition, the lower end 32*a* of the side peripheral wall 32 of the outside container main body 28 includes an extended foot portion 34 that is extended to be located downwardly from the bottom 26 of the inside container main body 14.

Therefore, the container itself can be self-sustaining and it is convenient.

Moreover, when the container is used for instance for applying an eye drop and for a collunarium, the size of the caliber of the container main body is limited because of the nozzle and the pump.

In this case, even if capacity necessary for limited usable years is secured by the size of the caliber of the limited container main body, the length of the sack body of the container main body never becomes long.

As a result, the length of the container 10 becomes long and the container 10 itself does not enlarge and, and it is convenient for handles and the storage etc.

In addition, the side peripheral wall 22 of the inside container main body 14 and the side peripheral wall 32 of the outside container main body 28 is formed as a double accumulating portion 36 in a portion of the side peripheral wall 14 of the inside container main body.

Therefore, the thickness of the side peripheral wall 22 of the inside container main body 14 and thickness of the side peripheral wall 32 of an outside container main body 28 and the thickness of the bottom 26 of the inside container main body 14 and can respectively be small (i e thin).

Thus, the thickness of the side peripheral wall 22 of the inside container main body 14 and the thickness of the side peripheral wall 32 of the outside container main body 28 can be thinned.

As a result, the visibility is superior and for instance, it is easy to confirm such as kinds and the remainder quantity of liquids and confirmations of the foreign matter contained in contents, i.e. of contents accommodated in an accommodating portion of a container main body.

Moreover, the thickness of the side peripheral wall 22 of the inside container main body 14 and thickness of the side peripheral wall 32 of the outside container main body 28 and the thickness of the bottom 26 of the inside container main body 14 are thin.

Therefore, the flexibility is superior and for instance, when using it for the eye drop container, as shown in arrow C of FIG. 1, when the container main body is squeezed, the container main body is easily flexured and squeezed.

Accordingly, it is superior in the effect that contents accommodated in the accommodating portion of the container main body is discharged.

In addition, a sloping bottom 24 that protrudes downward like dome such that the radius thereof is gradually decreased from the lower end of this side peripheral wall 22 of the inside container main body 14, and the bottom 26 of flat type in lower end are formed.

Therefore, the flexibility is superior and it is easy to squeeze.

Accordingly, it is superior in the effect that contents accommodated in the accommodating portion of the container main body is discharged.

Moreover, the side peripheral wall 22 of the inside container main body 14 and the side peripheral wall 32 of the outside container main body 28 is formed as a double accumulating portion 36 at least in a portion of the side peripheral wall 22 of the inside container main body 14.

Moreover, the lower end 32*a* of the side peripheral wall 32 of the outside container main body 28 includes an extended foot portion 34 that is extended to be located downwardly from the bottom 26 of the inside container main body 14.

Thus, as shown in Embodiment 2 described later, as disclosed in Patent Document 5 (JP4357183), even if it is used for a double container having a structure, in which the inside container is not returned to former shape when the squeeze play is operated (i.e. structure that becomes like the state that the inside container is deformed), when the squeeze play is done, the bottom 26 of the inside container main body 14 is not downwardly protruded from the lower end of the outside container main body 28 (the lower end 32*a* of the side peripheral wall 32 of the outside container main body 28).

As a result, the container can be self-sustaining.

In addition, when the container of the present invention is used for the pharmaceutical container in the eye drop container, the collunarium container, and the applying container, etc. for instance, the interior content can be reduced.

That is, about the pharmaceutical formulated in the hospital, by reducing the interior content of the pharmaceutical container, it becomes easy to be going to consume in a short term.

Therefore, the patient can use the pharmaceutical in the use time limit.

Thus, a regular formulation becomes possible for the patient.

In other words, the pharmaceutical is consumed in a short term so that the pharmaceutical should be formulated again.

Accordingly, there is an effect that presses an inevitable going to hospital regularly for the patient who needs a regular examination.

The method of manufacturing container 10 of the present invention component like this is described on the basis of FIG. 3 (A)-FIG. 6 (B) as follows.

Figure 3:
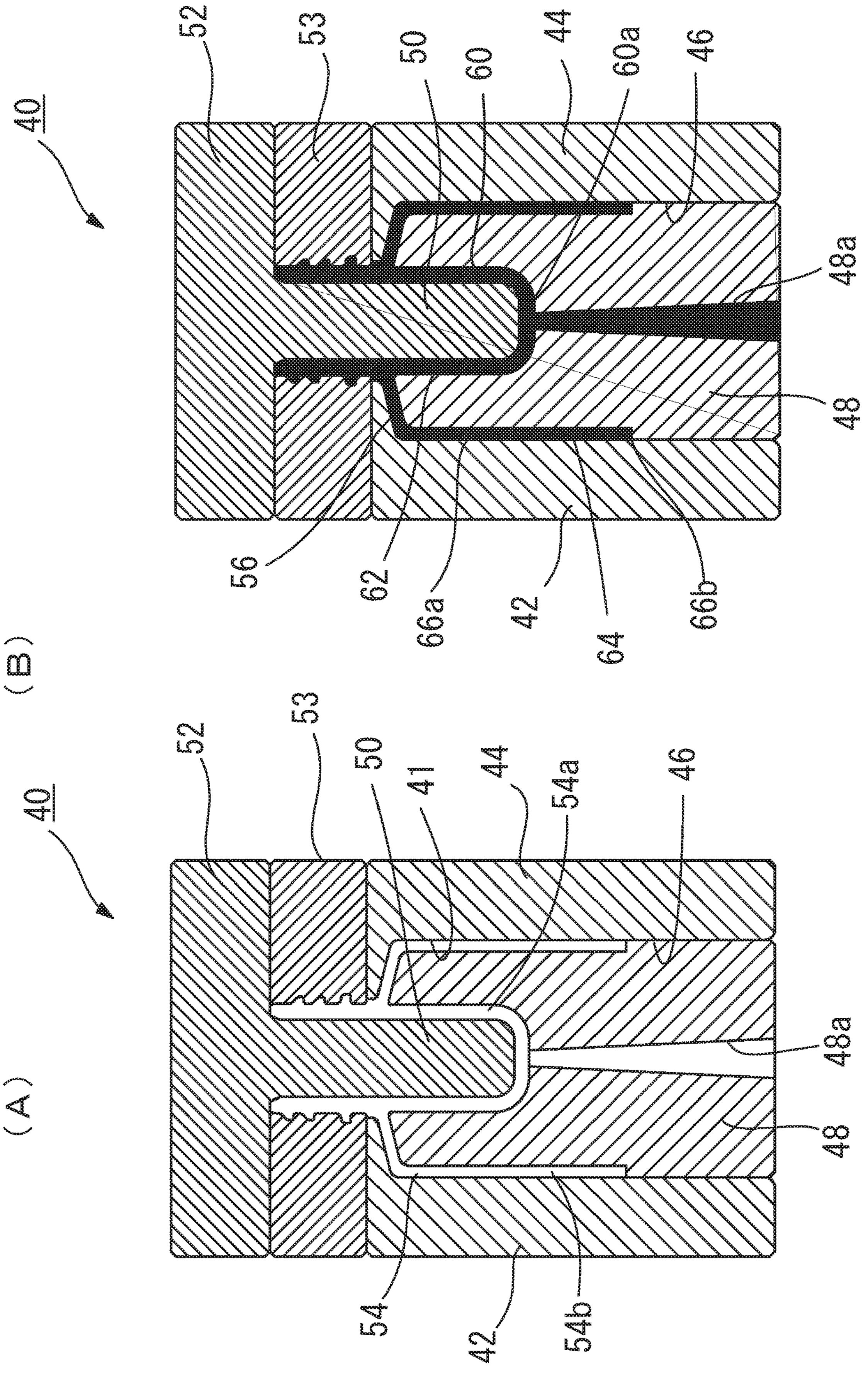
FIG. 3 (A)-FIG. 3 (B) is a schematic view that shows the injection molding step in which the parison is molded.
Figure 4:
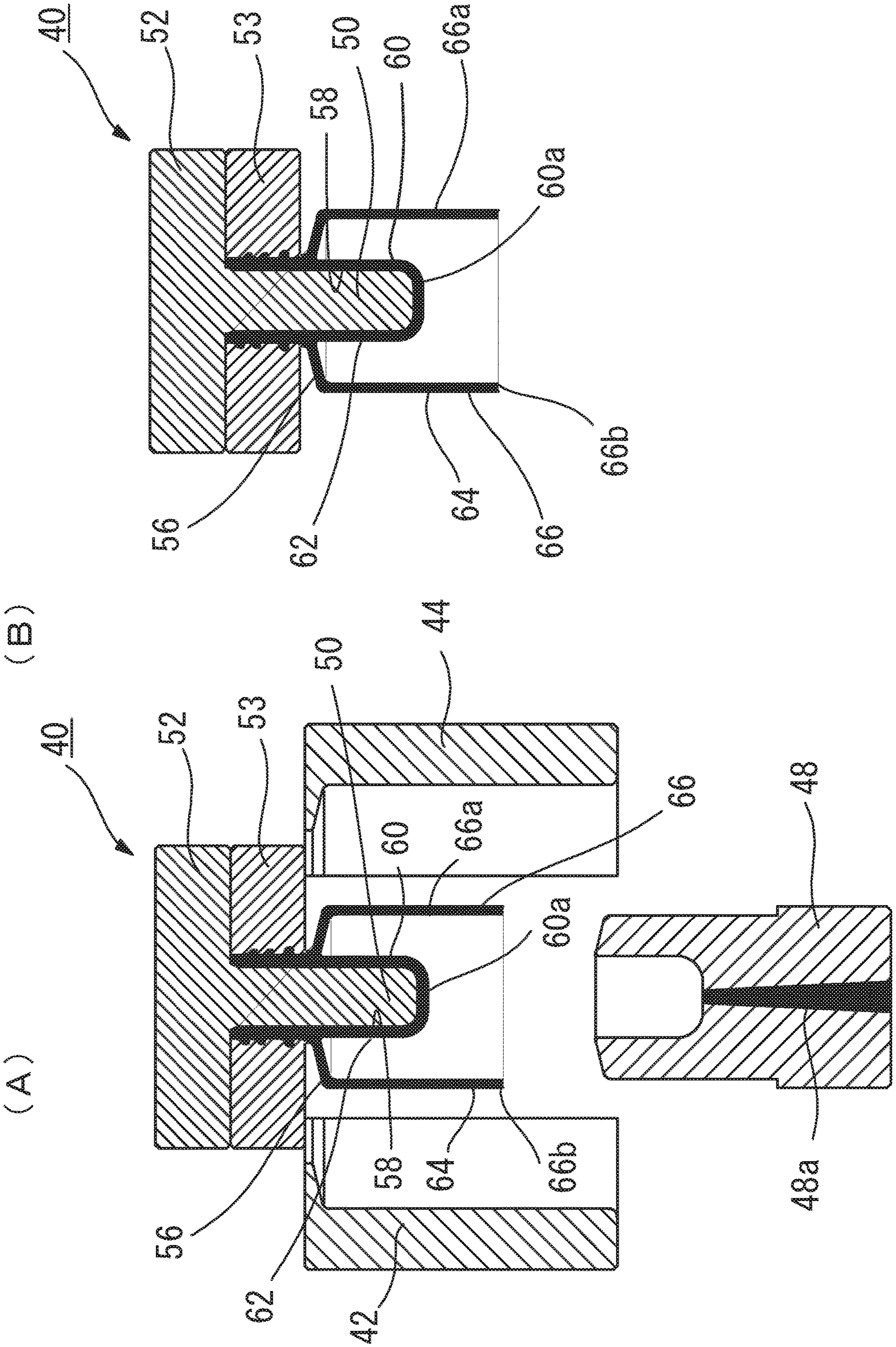
FIG. 4 (A)-FIG. 4 (B) is a schematic view that shows the injection molding step in which the parison is molded.

FIG. 3 (A)-FIG. 4 (B) is a schematic view that shows the injection molding step in which the parison is molded.

Figure 5:
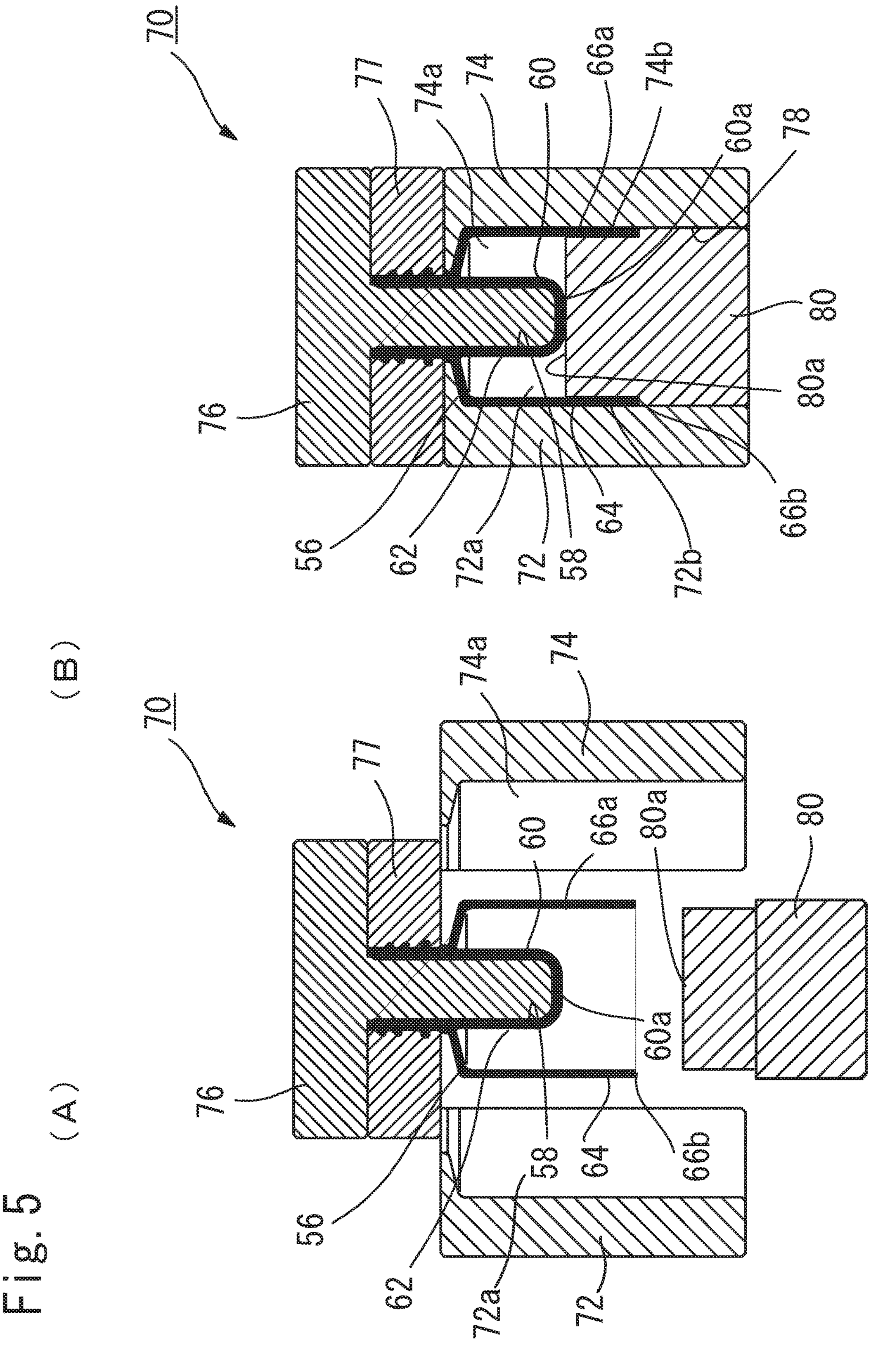
FIG. 5 (A)-FIG. 5 (B) is a schematic view that shows the blow molding step.

FIG. 5 (A)-FIG. 5 (B) is a schematic view that shows the blow molding step.

First of all, as shown in FIG. 3 (A), an injection molding die 40 is prepared.

This injection molding die 40 includes a pair of a left die 42 and a right die 44, which is able to abut and separate mutually.

Moreover, a lower die 48 that can be detachably fitted is provided in a recess 46, which is formed when these left die 42 and the right die 44 are tightened.

In addition, when these left die 42 and right die 44 are tightened, a recess 41 is formed to upper portion between the left die 42 and the right die 44.

In addition, an upper die 52, in which a protruded portion 50 like substantially cylindrical that can be detachably fitted to the recess 41, is formed.

Moreover, a screw die 53 having a shape corresponding to the male screw 18 of the capitula 20 of the container 10 is provided.

As shown in FIG. 3 (A), these left dies 42 and the right die 44 and the lower die 48, the upper die 52, and the screw dies 53 are tightened.

As a result, as described later, a space (cavity) 54 for injection molding is formed and it includes:

a space 54*a* for inside main body portion, which is corresponding to an inside main body portion 60 of a parison 56 that should become the inside container main body 14, is provided, and a space 54*b* for outside main body portion, which is more enlarged than the space 54*a* of this inside main body portion, and which is corresponding to the shoulder 30, the side peripheral wall 32, and the extended foot portion 34 of outside container main body 28 that is formed to extend downwardly.

Moreover, as shown in FIG. 3 (A), a gate 48*a* connected with the injection molding machine (not shown in the figure) is formed to the lower die 48.

In addition, under such a condition, as shown in FIG. 3 (B), through gate 48*a* of the lower die 48, melted resin is injected in the space (cavity) 54 for injection molding.

Thereafter, as shown in FIG. 4 (A), the left die 42, the right die 44, and the lower die 48 are moved in the direction such that they are separated mutually.

As a result, as shown in FIG. 4 (B), a parison 56 is formed to the upper die 52.

That is, as shown in FIG. 4 (B), this parison 56 includes:

an inside main body portion 60 comprising an accommodating portion forming portion 58 that should become the container main body 14, and an outside main body portion 66.

This outside main body portion 66 is more enlarged than a side peripheral wall 62 of the inside main body portion 60.

Moreover, a lower end 66*b* of a side peripheral wall 66*a* of the outside main body portion 66 includes:

the outside main body portion 66 that should become outside container main body 28, which has an extended foot portion 64 that is extended to be located downwardly from a bottom 60*a* of the inside main body portion 60.

Next, parison 56 formed like this, as shown in FIG. 5 (A), is blow molded by using a blow molding die 70.

That is, as shown in FIG. 5 (A), the blow molding die 70 includes:

a pair of a left die 72 and a right die 74, which is able to abut and separate mutually, and an upper die 76, and a screw die 77 which is fitted to the male screw 18 of the capitula 20 of the container 10.

Moreover, a lower die 80 that can be detachably fitted is provided in a recess 78, which is formed when these left die 72 and the right die 74 are tightened.

In this case, as for the upper die 76 and the screw die 77 of the blow molding die 70, it is desirable that, the upper die 52 and the screw die 53, which are used in the injection molding step in which the parison of FIG. 4 is molded, are used as they are.

As a result, the blow molding can be performed by using the same die.

Therefore, omission of number of parts, simplification of step, and preference of the cost and mass production are attained, and time can be saved.

Of course, once, the parison may be detached from the upper die 52 and the screw die 53, that are used in the injection molding step, in which the parison is molded.

Moreover, it is also possible to reserve the parison and they are blow molded by using another blow molding die 70.

Moreover, in the left die 72 and the right die 74, as shown in FIG. 5 (A), when these left die 72 and right die 74 are tightened, blow spaces 72*a* and 74*a* corresponding to the side peripheral wall 22 of the inside container main body 14 are formed respectively.

In addition, as shown in and FIG. 5 (B), the upper die 76, the left die 72, the right die 74, and the lower die 80 formed like this are tightened.

Moreover, an air blowing open (not shown) is formed openably to the upper die 76.

In addition, through this air blowing open and through the capitula of the parison 56, air is blown into the accommodating portion forming portion 58 of the inside main body portion 60, so that blow molding is performed.

In this case, as shown in FIG. 5 (B), by a lower portion 72*b* of a blow space 72*a* formed by the left die 72 and the lower die 80, and by a lower portion 74*b* of a blow space 74*a* formed by the right die 74 and the lower die 80, the extended foot portion 64 corresponding to the extended foot portion 34 is sandwiched.

Accordingly, in the blow molding, the injection shape of the parison 56 is held and the side peripheral wall 62 of the inside main body portion 60 of the parison 56 is swollen.

As a result, the inside container main body 14 can be formed.

Moreover, the lower die 80 includes an upper portion this facing surface 80*a*, which is abutted to a bottom 60*a* of the inside main body portion 60.

Figure 6:
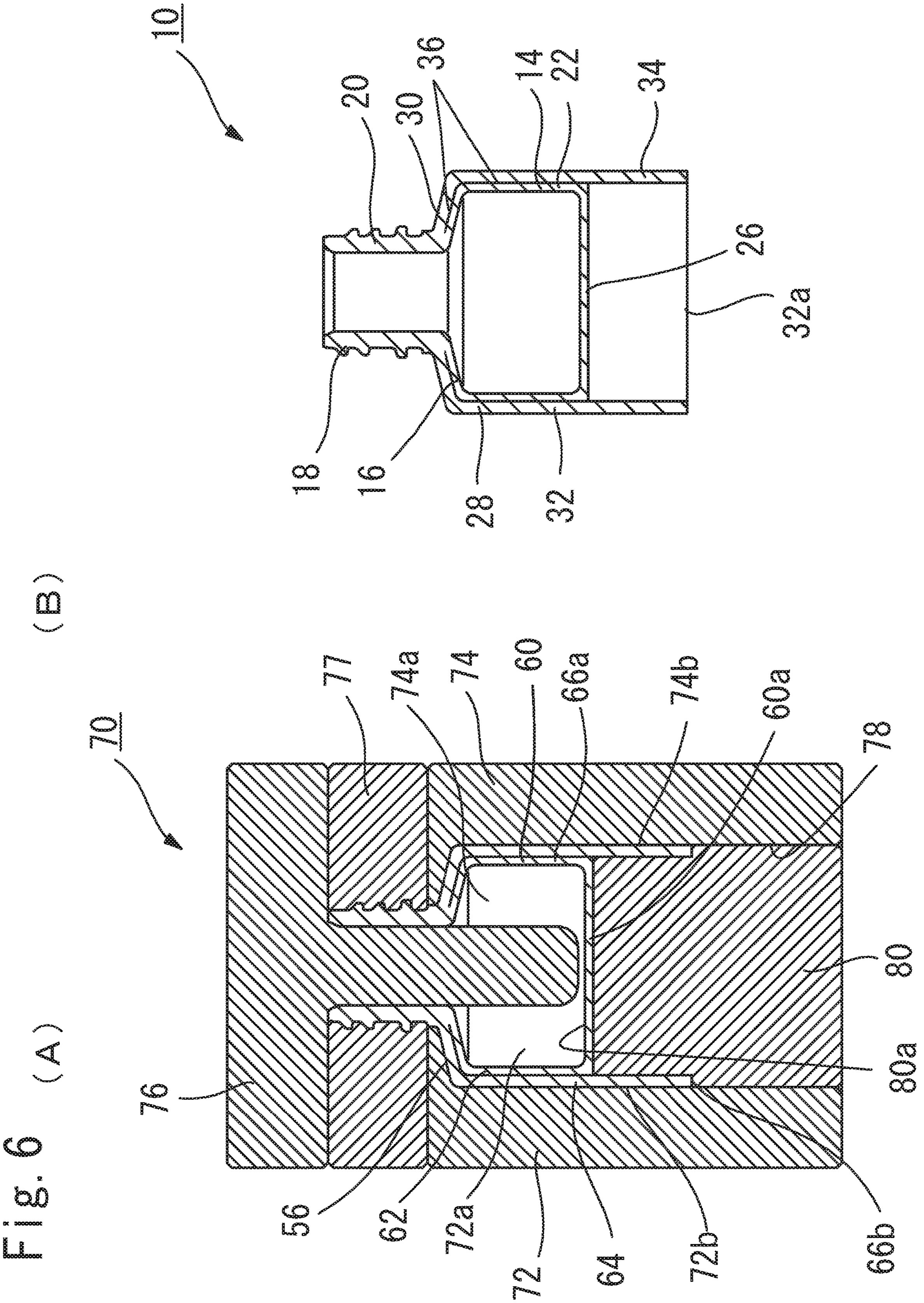
FIG. 6 (A)-FIG. 6 (B) is a schematic view that shows the blow molding step.

As a result, as shown in FIG. 6 (A), if the side peripheral wall 62 of the inside main body portion 60 of the parison 56 is swollen, the inside container main body 14 is formed.

In addition, in this Embodiment, the lower die 80 includes an upper portion this facing surface 80*a*, which is abutted to a bottom 60*a* of the inside main body portion 60.

However, without abutting the lower die 80 to the bottom 60*a* of the inside main body portion 60, the clearance is formed to some degree, so that it is also possible to perform blow molding by using so-called "stretch blow molding method".

In addition, if take it out of the blow molding die 70, as shown in FIG. 6 (B), the container 10 of the invention having structure as shown in FIG. 1-FIG. 2 is integrally molded.

In addition, in FIG. 6 (B), for convenience's sake of clarification, the sloping bottom 24 is omitted and the bottom 26 of the flat type in the lower end is only shown in the drawing.

That is, like this, the injection molding step in which parison 56 is molded and the blow molding step are performed.

As a result, the integrated container, comprising: the capitula 20 to put contents in and out in the container 10, and the inside container main body 14, in which the accommodating portion 12 that accommodates the contents is formed, and the outside container main body 28, which is formed to outer periphery side of the inside container main body 14, and which is formed to surround the inside container main body 14, and wherein the inside container main body 14 and the outside container main body 28 are integrated in the capitula 20, can be obtained.

Moreover, this container 10, the side peripheral wall 32 of the inside container main body 14 and the side peripheral wall 32 of the outside container main body 28 is formed as a double accumulating portion in a portion of the side peripheral wall 22 of the inside container main body 14, and the lower end 32*a* of the side peripheral wall 32 of the outside container main body 28 includes an extended foot portion 34 that is extended to be located downwardly from the bottom 26 of the inside container main body 14.

Thus, the integrated container 10, in which the interior content is reduced, can be simply manufactured, so that the cost can be reduced.

Moreover, the integral molding is performed by the injection molding step and the blow molding step that is operated in a single forming machine.

Therefore, the assembly process in the second step can be omitted.

As a result, a complicate, complex step is unnecessary, and the cost can be reduced.

Therefore, the foreign matter might not adhere, and the quality never decreases.

In addition, in this case, as for a material of the container 10 of the invention, it is not especially limited, if it is a thermoplastic plastic, in which injection molding and blow molding can be performed.

According to the use of container 10 of the invention, it may be selected appropriately.

That is, as for a synthetic resin to be used, in particular, it is not limited, for instance, polyethylene resin and polypropylene resin, etc. are available.

Moreover, in order to check the amount of contents in the container 10 visually, it is desirable that it is transparent and translucent.

However, it is not especially limited, and may be opaque.

Moreover, in the container of the invention, in the double accumulating portion 36, the side peripheral wall 22 of the inside container main body 14 and the side peripheral wall 32 of the outside container main body 28 may be separated.

By component like this, the side peripheral wall 22 of the inside container main body 14 and the side peripheral wall 32 of the outside container main body 28 are separated.

Thus, the thickness of the side peripheral wall 22 of the inside container main body 14 and the thickness of the side peripheral wall 32 of an outside container main body 28 can be thinned.

Therefore, the flexibility is superior and for instance, when using it for the eye drop container, it is easy to squeeze.

Accordingly, it is superior in the effect that contents accommodated in the accommodating portion of the container main body is discharged.

Moreover, in the container 10 of the invention, in the double accumulating portion 36, the side peripheral wall 22 of the inside container main body 14 and the side peripheral wall 32 of the outside container main body 28 are welded.

By component like this, the side peripheral wall 22 of the inside container main body 14 and the side peripheral wall 32 of the outside container main body 28 are welded.

Therefore, the strength is superior and the bottom of the inside container main body is thin and excellent in the flexibility.

As a result, for instance, when using it for the eye drop container, it is easy to squeeze.

Accordingly, it is superior in the effect that contents accommodated in the accommodating portion of the container main body is discharged.

Moreover, in the container 10 of the invention, as shown in FIG. 2 (A), it is desirable that thickness T1 of the inside container main body 14 is smaller than thickness T2 of the outside container main body 28.

By component like this, thickness T1 of the inside container main body 14 is smaller than thickness T2 of the outside container main body 28 (T1<T2).

Therefore, the inside container main body 14 is excellent in the flexibility.

As a result, for instance, when using it for the eye drop container, it is easy to squeeze.

Accordingly, it is superior in the effect that contents accommodated in the accommodating portion of the container main body is discharged.

Moreover, the thickness T1 of the inside container main body 14 is smaller than the thickness T2 of the outside container main body 28 and the inside container main body 14 is excellent in the flexibility.

Therefore, it suitable in case that, for example, as disclosed in Patent Document 5 (JP4357183), even if it is used for a double container having a structure, in which the inside container is not returned to former shape when the squeeze play is operated (i.e. structure that becomes like the state that the inside container is deformed).

Figure 7:
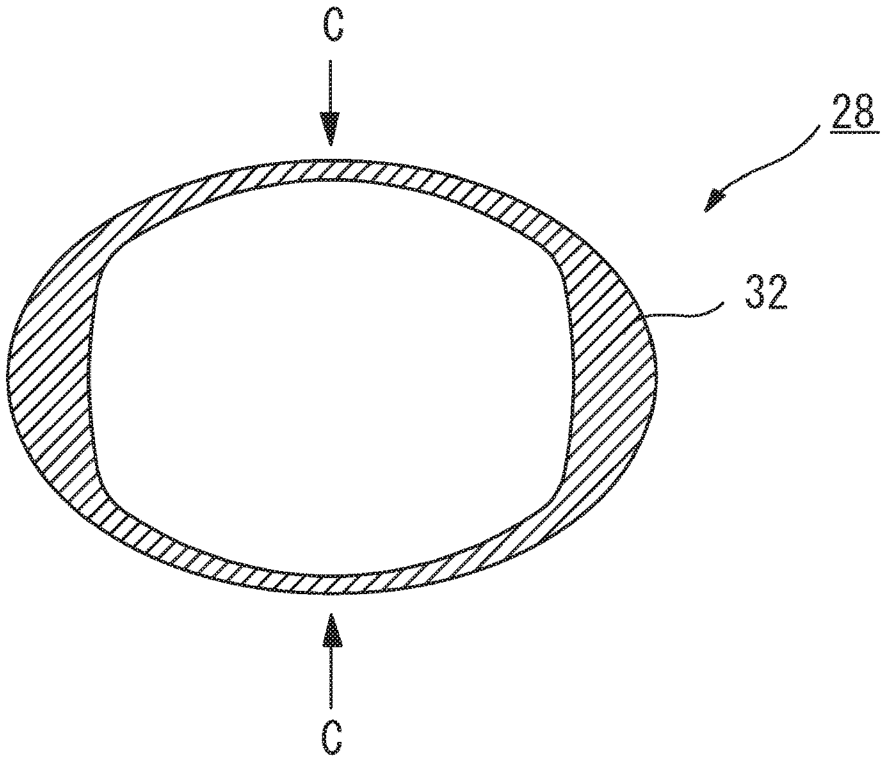
FIG. 7 (A) is cross-sectional view of the side peripheral wall 32 of the outside container main body 28 that shows another Embodiment of the container of the invention.
Figure 7:
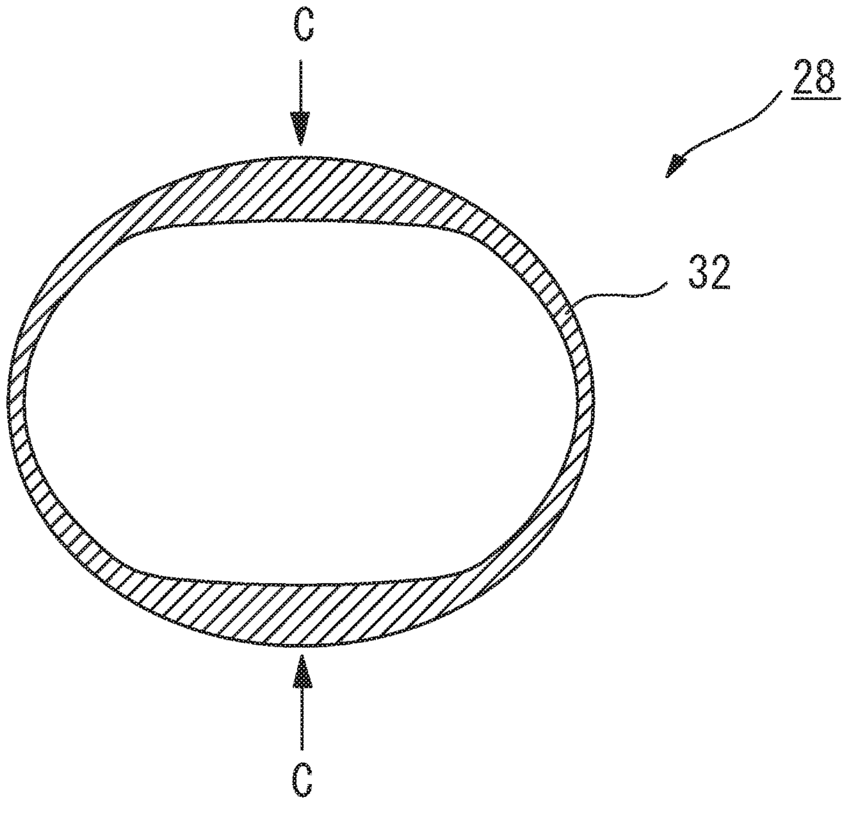

Moreover, in the container 10 of the invention, as shown in FIG. 7 (A), it is desirable that the thickness of the side peripheral wall 32 of the outside container main body 28 is gradually small toward the edge on the squeeze side.

By component like this, the thickness of the side peripheral wall 32 of the outside container main body 28 is gradually small toward the edge on the squeeze side.

As a result, as shown by arrow C of FIG. 7 (A), when the container main body is squeezed at the squeeze play side, the container main body is easily flexured and squeezed on the squeeze play side.

Accordingly, it is superior in the effect that contents accommodated in the accommodating portion of the container main body is discharged.

Moreover, in the container 10 of the invention, as shown in FIG. 7 (B), it is desirable that the thickness of the side peripheral wall 32 of the outside container main body 28 is gradually small toward the edge on an orthogonal side to the squeeze play side.

By component like this, the thickness of the side peripheral wall 32 of the outside container main body 28 is gradually small toward the edge on an orthogonal side to the squeeze play side.

As a result, as shown by arrow C of FIG. 7 (B), when the container main body is squeezed at the squeeze play side, also on the side to the squeeze play side, the container main body is easily flexured and easily squeezed overall on the squeeze play side.

Accordingly, it is superior in the effect that contents accommodated in the accommodating portion of the container main body is discharged.

Figure 8:
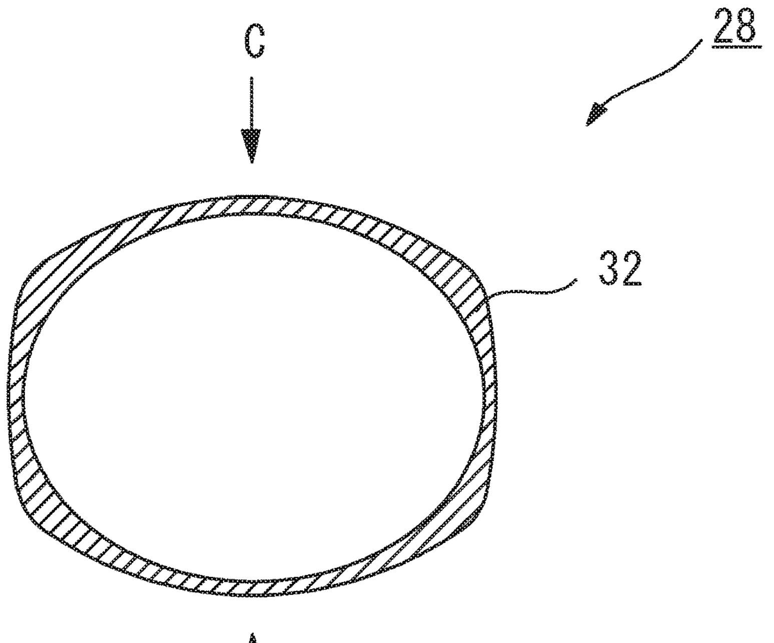
FIG. 8 (A) is cross-sectional view of the side peripheral wall 32 of the outside container main body 28 that shows another Embodiment of the container of the invention.
Figure 8:
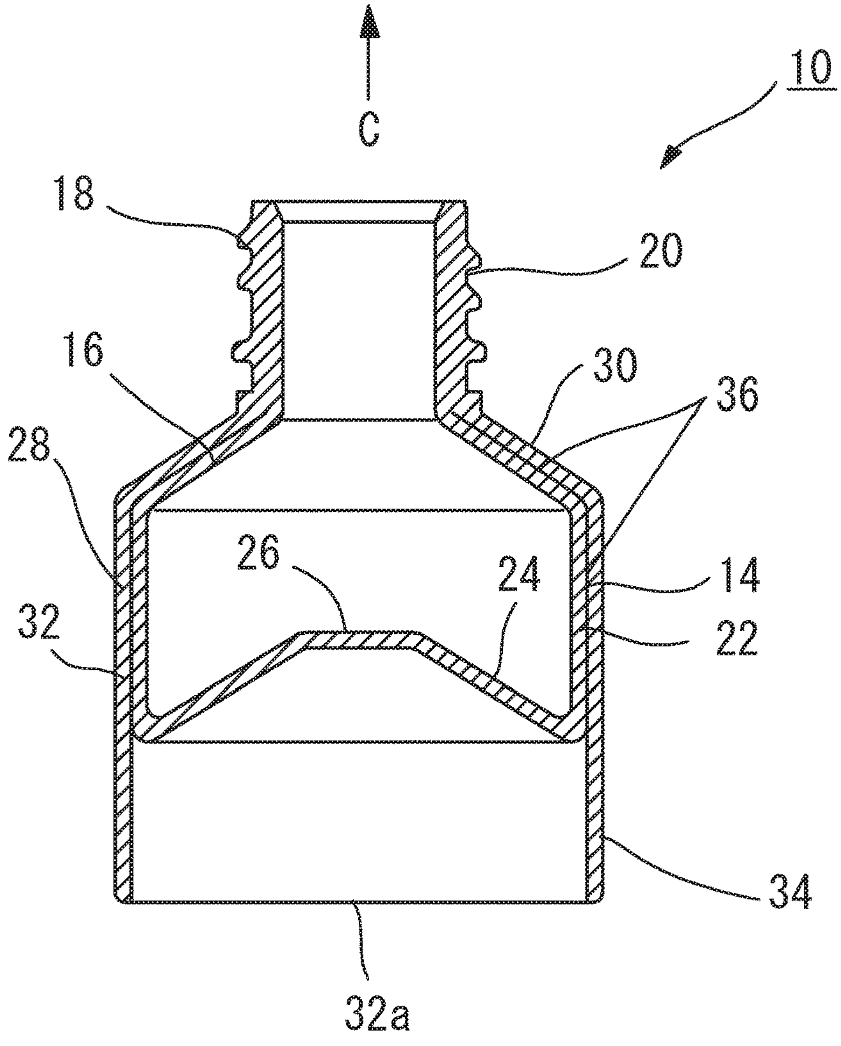

Moreover, in the container 10 of the invention, as shown in FIG. 8 (A), it is desirable that, the thickness of the side peripheral wall 32 of the outside container main body 28 is gradually small toward the edge on the squeeze side, the thickness of the side peripheral wall 32 of the outside container main body 28 is gradually small toward the edge on an orthogonal side to the squeeze play side.

By component like this, as shown by arrow C of FIG. 8 (A), when the container main body is squeezed at the squeeze play side, the container main body is easily flexured and squeezed on the squeeze play side.

Moreover, when the container main body is squeezed at the squeeze play side, also on the side to the squeeze play side, the container main body is easily flexured and easily squeezed overall on the squeeze play side.

Accordingly, it is superior in the effect that contents accommodated in the accommodating portion of the container main body is discharged.

In addition, in this Embodiment, a sloping bottom 24 that protrudes downward like dome such that the radius thereof is gradually decreased from the lower end of this side peripheral wall 22 of the inside container main body 14, and the bottom 26 of flat type in lower end are formed.

However, as shown in FIG. 8 (B), a sloping bottom 24 that protrudes upward like dome such that the radius thereof is gradually decreased from the lower end of this side peripheral wall 22 of the inside container main body 14, and the bottom 26 of flat type in lower end may be formed.

Moreover, the shape of the bottom of the inside container main body 14 and the shape of the extended foot portion 34 of the outside container main body 28 are not especially limited.

For instance, it may be adopted that various shape shown in FIG. 7-FIG. 15 of Patent Document 1 (JP, 2016-94213, A).

That is, though the detail thereof is not shown in the drawing, for instance, as shown in FIG. 7 of Patent Document 1, in the container 10 of the invention, plurality of the extended foot portion 34 may be formed at a part of the side peripheral wall 32 of the outside container main body 28.

Moreover, as shown in FIG. 8-FIG. 11 of Patent Document 1, in the container 10 of the invention, between the bottom 26 of the inside container main body 14 and the extended foot portion 34, plurality of the rib for the reinforcement (rib of the truss shape of the substantially triangle) may be substituted and formed in the predetermined space.

Figure 12:
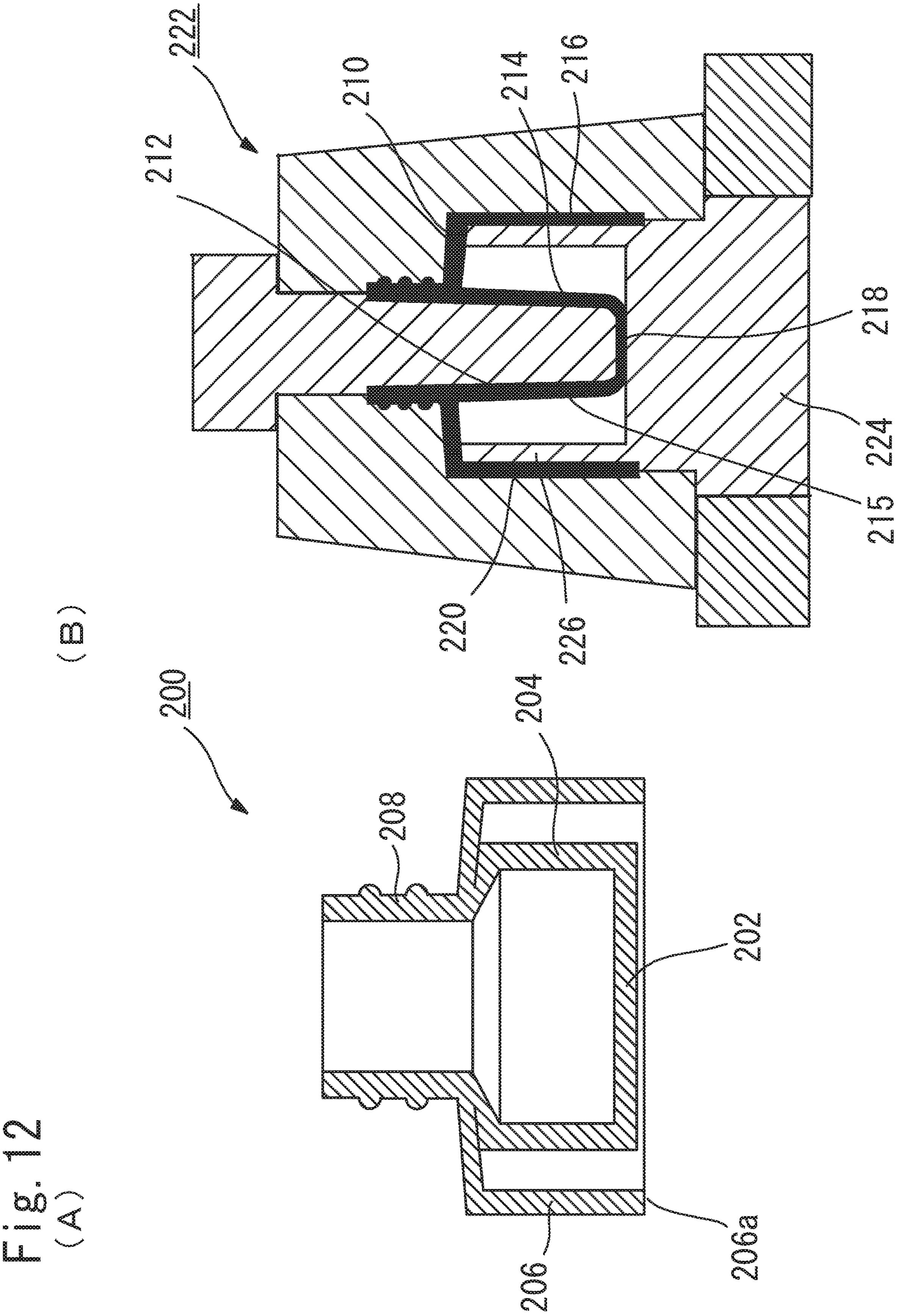
FIG. 12 (A) is a longitudinal sectional view of the double container 200 of Patent Document 2.
Figure 13:
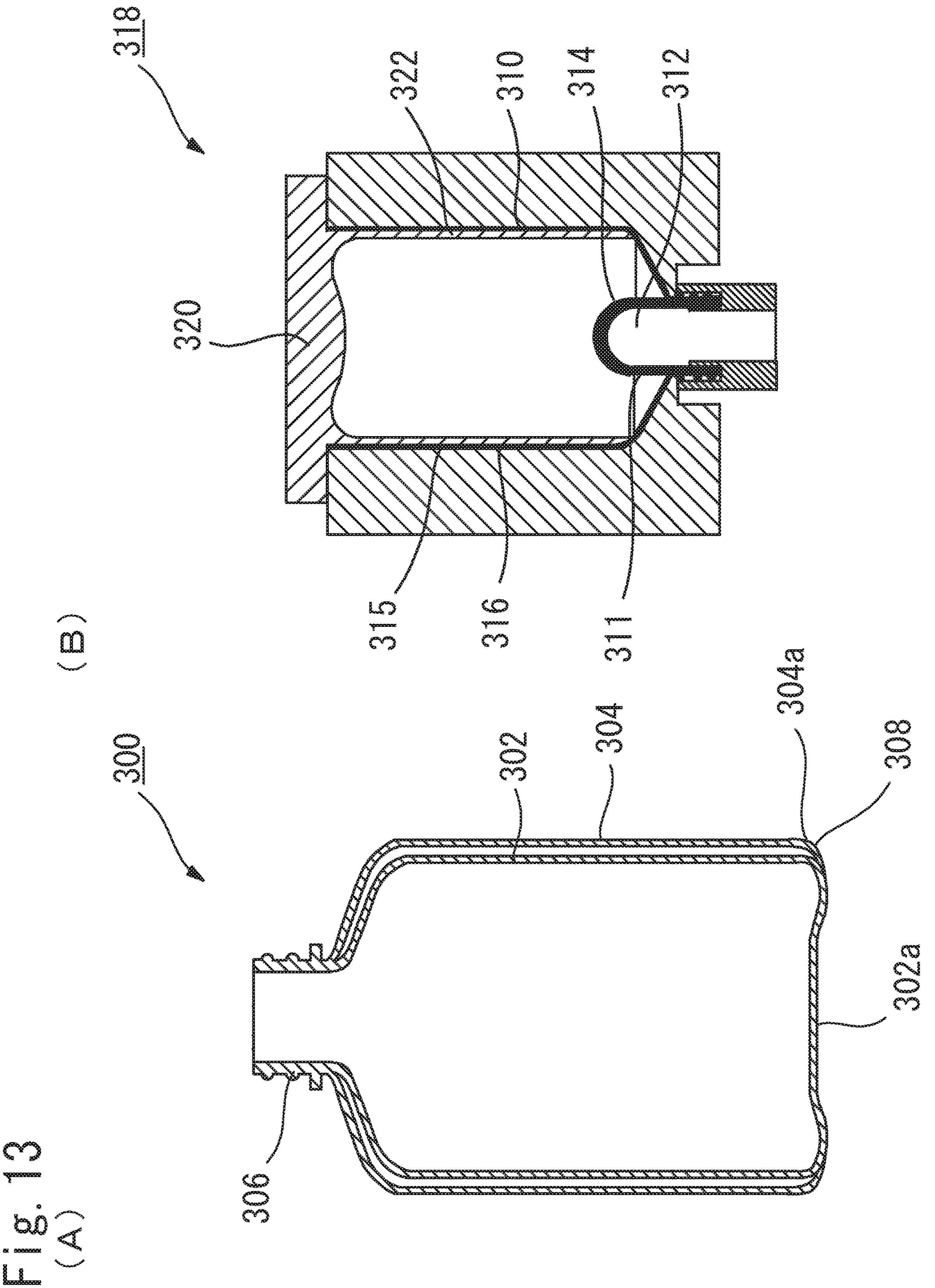
FIG. 13 (A) is a longitudinal sectional view of the double container 300 of Patent Document 3 and Patent Document 4.

In addition, as shown in FIG. 12-FIG. 13 of Patent Document 1, in the container 10 of the invention, the bottom of inside container main body 14 may be formed like the taper shape or the dome, etc. which is protruded toward under.

In addition, as shown in FIG. 14 of Patent Document 1, in the container 10 of the invention, the bottom of inside container main body 14 may be formed like the taper shape or the dome, etc. which is protruded toward upper.

In addition, as shown in FIG. 15 of Patent Document 1, in the container 10 of the invention, the bottom of inside container main body 14 may be formed in the bellows shape.

Embodiment 2

Figure 9:
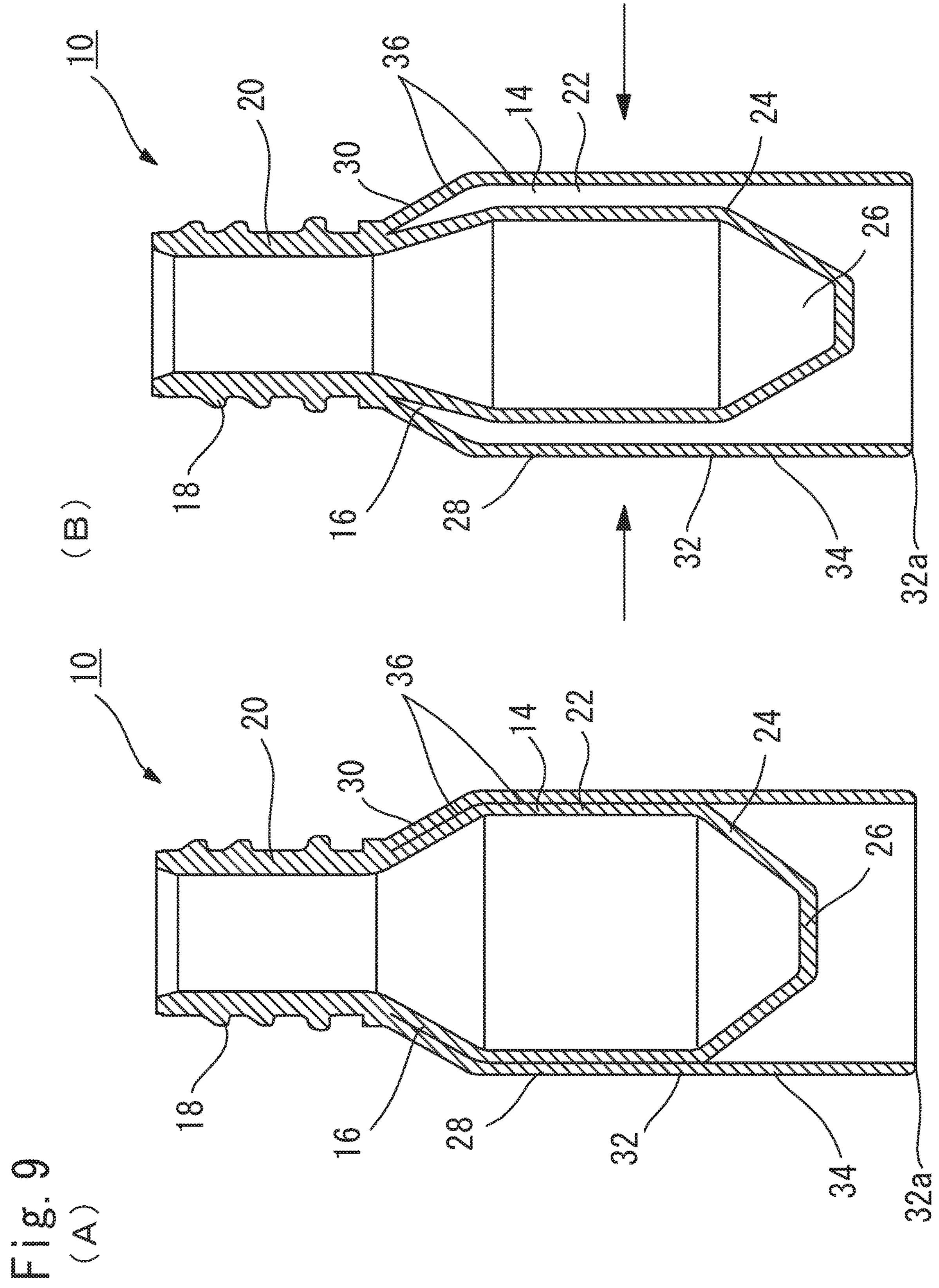
FIG. 9 (A) is similar cross-sectional view to FIG. 2 (B), in which another Embodiment of the container of the invention is shown.
Figure 10:
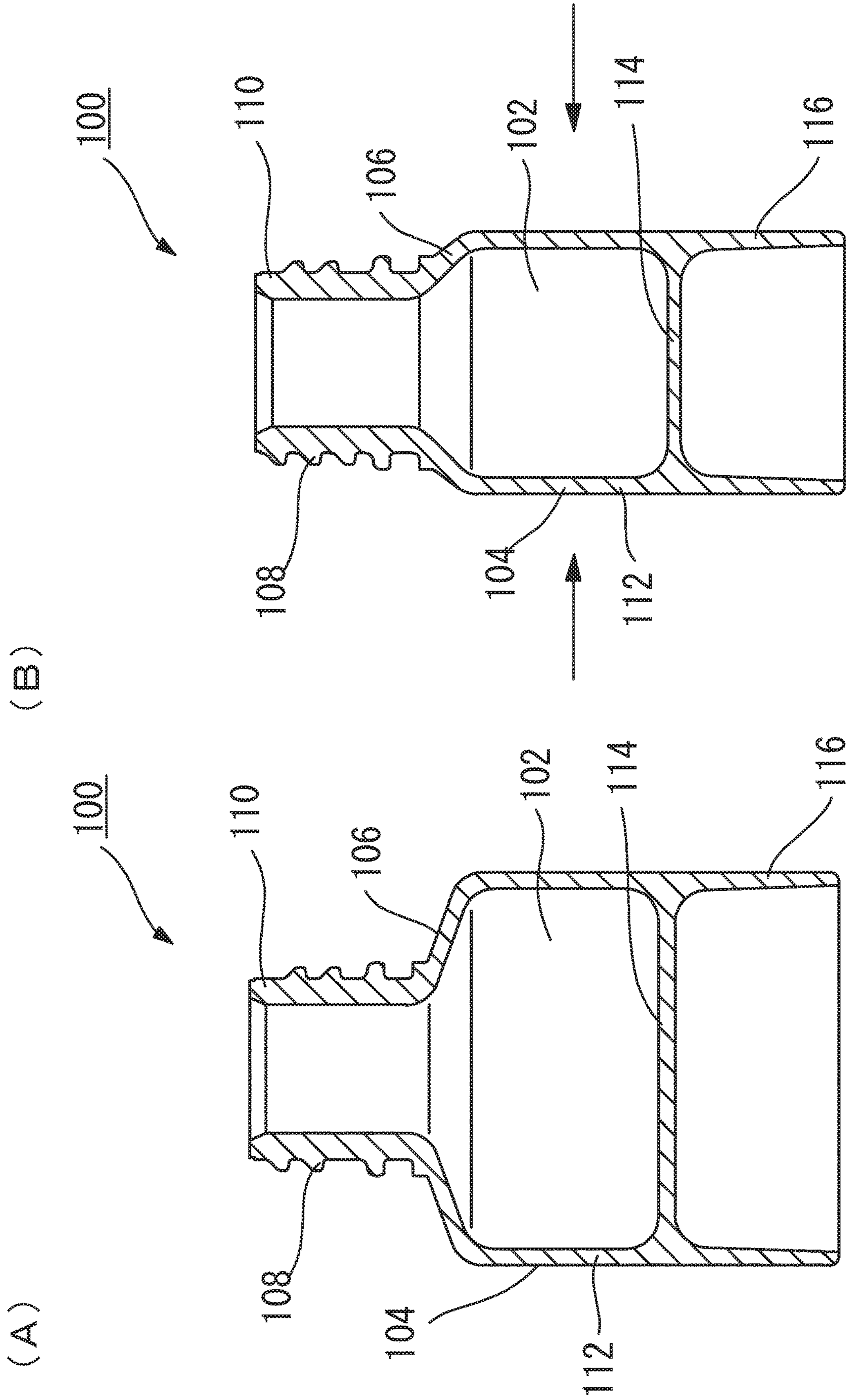
FIG. 10 (A) is cross-sectional view of the container 100 of Patent Document 1.
Figure 11:
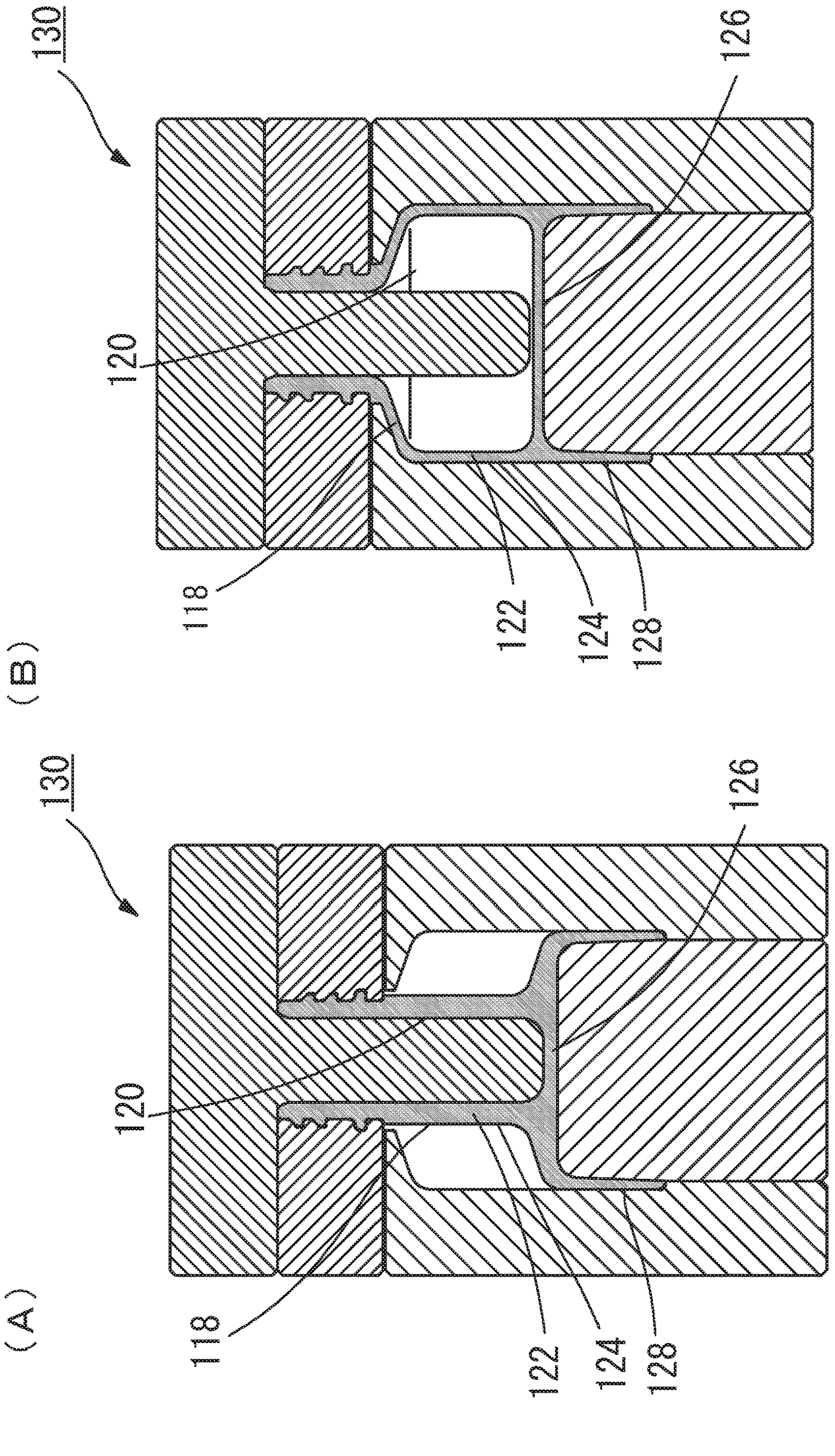
FIG. 11 is a schematic view that describes the method of producing the container 100 of Patent Document 1.

FIG. 9 (A) is similar cross-sectional view to FIG. 2 (B), in which another Embodiment of the container of the invention is shown.

FIG. 9 (B) is schematic cross-sectional view, in which the use of the container of the invention of FIG. 9 (A) is described.

The container 10 of this Embodiment is basically similar to composition of the container 10 of the Embodiment shown in FIG. 1-FIG. 8.

The same reference numerals refer to the same composition members, and the detailed explanation is omitted.

In the container 10 of this Embodiment, as shown in FIG. 9 (A)-FIG. 9 (B), as disclosed in Patent Document 5 (JP4357183), this Embodiment is suitable that is used for a double container having a structure, in which the inside container is not returned to former shape when the squeeze play is operated (i.e. structure that becomes like the state that the inside container is deformed), That is, in the container 10 of this Embodiment, the length to a lower end 32*a* of the side peripheral wall 32 of the outside container main body 28 is comparatively longer than the container 10 of the Embodiment shown in FIG. 1-FIG. 8.

Moreover, corresponding to this, the length to the bottom 26 of the inside container main body 14 is also long.

In addition, in the double accumulating portion 36, the side peripheral wall 22 of the inside container main body 14 and the side peripheral wall 32 of outside container main body 28 is separated.

Moreover, though not shown in the drawing, it is the double container, in which similar capitula structure to the distribution valve 24 (the valve flange 24*c* and the valve head 24*b*) that functions as opening and closing valve of Patent Document 5, namely, the inside container is not returned to former shape when the squeeze play is operated (i.e. structure that becomes like the state that the inside container is deformed).

As a result, as shown by the arrow of FIG. 9 (B), the inside container is not returned to former shape when the squeeze play is operated (i.e. structure that becomes like the state that the inside container is deformed), Therefore, as disclosed in Patent Document 5 (JP4357183), even if it is used for a double container having a structure, in which the inside container is not returned to former shape when the squeeze play is operated (i.e. structure that becomes like the state that the inside container is deformed), when the squeeze play is done, the bottom 26 of the inside container main body 14 is not downwardly protruded from the lower end of the outside container main body 28 (the lower end 32*a* of the side peripheral wall 32 of the outside container main body 28).

As a result, the container can be self-sustaining

Although preferable embodiment of the invention is described above, the invention is not limited to this embodiment.

For Example, the above-mentioned Embodiment is explained about the container, in which the container is to accommodate the contents: including, for instance, liquid material, fluid, half fluid, and solids such as solid body and particulate objects that are accommodated by the accommodating portion in the container, for example, in the container of the pharmaceutical container such as an eye drop container, a collunarium container, and an applying container and the like.

For instance, moreover, the invention can be applied to the container where the interior content of contents accommodate in the container is demanded to be reduced, in the food field and the industrial area, etc.

Moreover, in the above-mentioned Embodiment, the manufacturing method by using the die of the longitude putting type is described.

However, it may be manufactured by using the die of so-called “Horizontal putting type”.

Moreover, a plurality of container 10 can be obtained at a time by the use of the die that is called so-called “The multitude piece producing type”.

Therefore, various changes are possible in the scope in which it does not deviate from the object of the invention.

INDUSTRIAL APPLICABILITY

The invention is applicable to a container and a method of producing a container, in which the container is a container that can be self-sustaining, and in which the container is to accommodate the contents: including, for instance, liquid material, fluid, half fluid, and solids such as solid body and particulate objects that are accommodated by the accommodating portion in the container, for example, in the container of the pharmaceutical container such as an eye drop container, a collunarium container, and an applying container and the like.

Moreover, the invention is applicable to a container and a method of producing a container, in which the interior content of contents accommodate in the container is reduced.

For instance, the invention is applicable to a container and a method of producing a container, in which the container is a container that can be self-sustaining, and in which the container is to accommodate the contents: including, for instance, liquid material, fluid, half fluid, and solids such as solid body and particulate objects that are accommodated by the accommodating portion in the container, for example, in the container of the pharmaceutical container such as an eye drop container, a collunarium container, and an applying container and the like.

EXPLANATION OF LETTERS OR NUMERALS

10
Container
12
Accommodating portion
14
Inside container main body
16
Shoulder
18
Male screw
20
Capitula
22
Side peripheral wall
24
Sloping bottom
26
bottom
28
Outside container main body
30
Shoulder
32
Side peripheral wall
**32*a***
Lower end
34
Extended foot portion
36
Accumulating portion
40
Injection molding die
41
Recess
42
Left die
44
Right die
46
Recess
48
Lower die
**48*a***
Gate
50
Protruded portion
52
Upper die
53
Screw die
**54*a***
Space for inside main body portion
**54*b***
Space for outside main body portion
56
Parison
58
Accommodating portion forming portion
60
Inside main body portion
**60*a***
Bottom
62
Side peripheral wall
64
Extended foot portion
66
Outside main body portion
**66*a***
Side peripheral wall
**66*b***
Lower end
70
Blow molding die
72
Left die
**72*a***
Blow space
**72*b***
Lower part
74
Right die
**74*a***
Blow space
**74*b***
Lower part
76
Upper die
77
Screw die
78
Recess
80
Lower die
**80*a***
Upper portion facing surface

The invention claimed is:

1. A container comprising:

a neck portion having an opening to put contents into and out from the container;

an inside container main body, in which an accommodating portion that accommodates the contents is formed; and an outside container main body, which is formed on an outer periphery side of the inside container main body, and surrounds the inside container main body, wherein the inside container main body and the outside container main body are integrated at the neck portion, a side peripheral wall of the inside container main body and a side peripheral wall of the outside container main body are in contact with each other and are formed as a first accumulating portion along an entire side peripheral wall of the inside container main body, and a lower end of the side peripheral wall of the outside container main body includes an extended foot portion that is extended to a location lower than a bottom of the inside container main body.

2. The container as defined in claim 1, wherein in the first accumulating portion, the side peripheral wall of the inside container main body and the side peripheral wall of the outside container main body are detachable.

3. The container as defined in claim 1, wherein in the first accumulating portion, the side peripheral wall of the inside container main body and the side peripheral wall of the outside container main body are welded.

4. The container as defined in claim 1, wherein a thickness of the side peripheral wall of the inside container main body is smaller than a thickness of the side peripheral wall of the outside container main body.

5. The container as defined in claim 1, wherein a cross section of the outside container main body is substantially perpendicular to the side peripheral wall of the outside container main body, and a thickness of the side peripheral wall of the outside container main body gradually decreases along a direction from a first portion of a circumference of the cross section at the largest width of the cross section to a second portion of the circumference of the cross section at the smallest width of the cross section.

6. The container as defined in claim 1, wherein a cross section of the outside container main body is substantially perpendicular to the side peripheral wall of the outside container main body, and a thickness of the side peripheral wall of the outside container main body gradually decreases along a direction from a third portion of a circumference of the cross section at the smallest width of the cross section to a fourth portion of the circumference of the cross section at the largest width of the cross section.

7. The container as defined in claim 5, wherein the side peripheral wall of the outside container main body at the second portion is configured to be squeezed.

8. The container as defined in claim 6, wherein the side peripheral wall of the outside container main body at the fourth portion is configured to be squeezed.

9. The container as defined in claim 1, wherein a first shoulder portion of the inside container main body extends from the neck portion to the side peripheral wall of the inside container main body, a second shoulder portion of the outside container main body extends from the neck portion to the side peripheral wall of the outside container main body, and the first shoulder portion and the second shoulder portion are in contact with each other and are formed as a second accumulating portion.

* * * * *